(12) United States Patent
Kiyokawa

(10) Patent No.: US 12,709,470 B2
(45) Date of Patent: Aug. 18, 2026

(54) ARTICLE STORAGE FACILITY, ARTICLE STORAGE METHOD AND ARTICLE STORAGE PROGRAM

(71) Applicant: Daifuku Co., Ltd., Osaka (JP)

(72) Inventor: Wataru Kiyokawa, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 279 days.

(21) Appl. No.: 18/691,150

(22) PCT Filed: Sep. 7, 2022

(86) PCT No.: PCT/JP2022/033504
§ 371 (c)(1),
(2) Date: Mar. 12, 2024

(87) PCT Pub. No.: WO2023/038046
PCT Pub. Date: Mar. 16, 2023

(65) Prior Publication Data

US 2024/0375873 A1 Nov. 14, 2024

(30) Foreign Application Priority Data

Sep. 13, 2021 (JP) ................................ 2021-148606

(51) Int. Cl.
*B65G 1/00* (2006.01)
*B65G 1/04* (2006.01)
(Continued)

(52) U.S. Cl.
CPC ................ *B65G 1/00* (2013.01); *B65G 1/04* (2013.01); *B65G 1/0435* (2013.01);
(Continued)

(58) Field of Classification Search
CPC .......... B65G 1/00; B65G 1/1371; B65G 1/04; B65G 1/06; B65G 1/0492; B65G 1/0435; B65G 1/137; B65G 1/1373
See application file for complete search history.

(56) References Cited

U.S. PATENT DOCUMENTS 9,714,139 B1 * 7/2017 Aggarwal ................ B65G 1/16
2010/0172724 A1 * 7/2010 Hawkes ............... B65G 59/062 414/807
(Continued)

FOREIGN PATENT DOCUMENTS

CA 3048757 A1 * 1/2020 .......... G06Q 10/087
CN 11470239 A 7/2020
(Continued)

*Primary Examiner* — Thomas Randazzo
(74) *Attorney, Agent, or Firm* — The Webb Law Firm

(57) ABSTRACT

A control system controls a transport device (5) so as to preferentially store a high frequency article (WH) at a first storage position (P1) and preferentially store a normal article (WN) at a normal storage position (PN). The high frequency article (WH) is an article of an article type for which the retrieval frequency is a predetermined high frequency threshold value or more, and the normal article (WN) which is an article of an article type for which the retrieval frequency is less than the high frequency threshold value. Each storage section has a plurality of storage positions at which articles can be stored, including at least one first storage position (P1), which is a storage position closest to a rack front surface side (Y1), and at least one normal storage position (PN), which is a storage position on a rack back surface side (Y2) of the first storage position (P1).

11 Claims, 9 Drawing Sheets

(51) Int. Cl.
*B65G 1/06* (2006.01)
*B65G 1/137* (2006.01)

(52) U.S. Cl.
CPC ............. *B65G 1/0492* (2013.01); *B65G 1/06* (2013.01); *B65G 1/137* (2013.01); *B65G 1/1371* (2013.01); *B65G 1/1373* (2013.01)

(56) References Cited

U.S. PATENT DOCUMENTS

| | | | | |
|---|---|---|---|---|
| 2017/0043953 | A1* | 2/2017 | Battles ................. | G06Q 10/087 |
| 2018/0127212 | A1* | 5/2018 | Jarvis ................... | B65G 1/1375 |
| 2022/0234831 | A1 | 7/2022 | Szyszkowski et al. | |

FOREIGN PATENT DOCUMENTS

| | | | | | |
|---|---|---|---|---|---|
| CN | 111824649 | A | | 10/2020 | |
| DE | 202004006920 | U1 | * | 9/2005 | ........... H05K 13/086 |
| EP | 4122842 | B1 | * | 12/2024 | ........... B65G 1/0435 |
| EP | 4501815 | A1 | * | 2/2025 | ............. B65G 1/137 |
| GB | 2638776 | A | * | 9/2025 | ............. B65G 43/10 |
| JP | 1111611 | A | | 1/1999 | |
| JP | 11310311 | A | | 11/1999 | |
| JP | 2007238302 | A | | 9/2007 | |
| JP | 2009286617 | A | | 12/2009 | |
| JP | 2010174504 | A | | 8/2010 | |
| JP | 2021038048 | A | * | 3/2021 | |
| JP | 7279584 | B2 | * | 5/2023 | |
| JP | 2023525729 | A | * | 6/2023 | ........... B65G 1/0492 |
| PT | 1409376 | E | * | 6/2007 | ........... B65G 1/0407 |
| WO | 2021010298 | A1 | | 1/2021 | |
| WO | WO-2023061459 | A1 | * | 4/2023 | ............. G06Q 10/08 |

* cited by examiner 100
1
1
2
2
3
3
5
10
10
10
10
10
20
51
W
W
41(4)
42(4)
43(4)
44(4)
45(4)
46
(4)
X
X1
X2
Y
Y1
Y2
Y
Y1
Y2
Z
Z1
Z2

PN (P)
P1 (P)
P1 (P)
PN (P)
1
1
51
20
W
5
60
65
T
66
W
X2
X
X1
W
50
20
10
10
1a
Y2
Y
Y1
Y1
Y
Y2
3
3
43(4)
44(4)
45(4)
46(4)
100
41(4)
42(4)
2
2

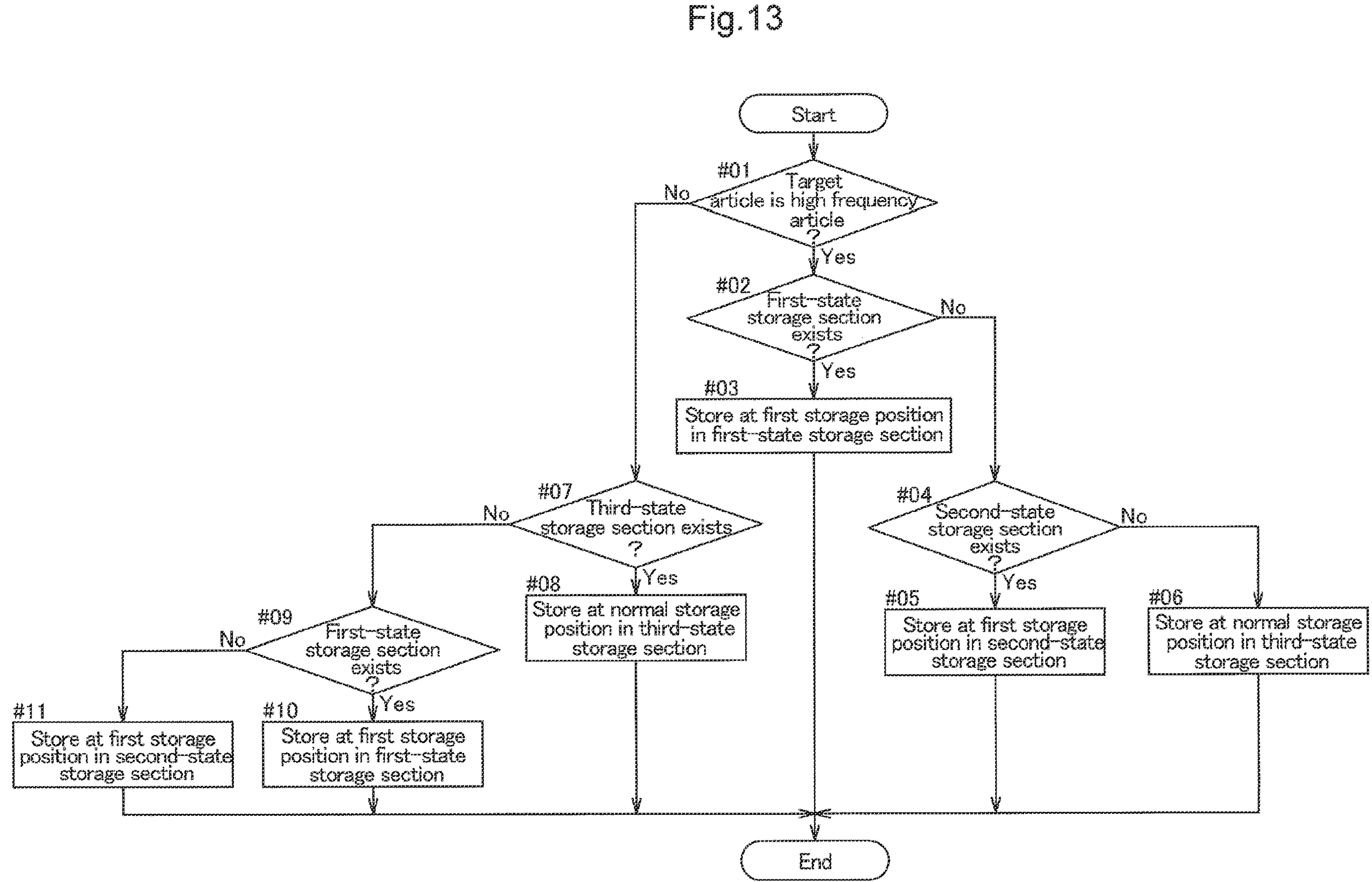
Fig.13
Start
#01
Target article is high frequency article ?
Yes
No
#02
First-state storage section exists ?
Yes
No
#03
Store at first storage position in first-state storage section
#04
Second-state storage section exists ?
Yes
No
#05
Store at first storage position in second-state storage section
#06
Store at normal storage position in third-state storage section
#07
Third-state storage section exists ?
Yes
No
#08
Store at normal storage position in third-state storage section
#09
First-state storage section exists ?
Yes
No
#10
Store at first storage position in first-state storage section
#11
Store at first storage position in second-state storage section
End 100
1
20
WL
(WN)
WM
(WN)
WH
3
50
(5)
1a
51
68
P3
(PN,P)
P2
(PN,P)
P1
(P)
67(60)
WH
68
Y
Y1
Y2
X
X1
X2

ARTICLE STORAGE FACILITY, ARTICLE STORAGE METHOD AND ARTICLE STORAGE PROGRAM

CROSS REFERENCE TO RELATED APPLICATIONS

This application is the United States national phase of International Patent Application No. PCT/JP2022/033504 filed Sep. 7, 2022, and claims priority to Japanese Patent Application No. 2021-148606 filed Sep. 13, 2021, the disclosures of which are hereby incorporated by reference in their entireties.

BACKGROUND OF THE INVENTION

Field of the Invention

The present invention relates to an article storage facility, an article storage method, and an article storage program.

Description of Related Art

An example of an article storage facility is disclosed in JP 2007-238302A (Patent Document 1). In the following description of background art, the reference numerals used in Patent Document 1 will be cited in parentheses. An article storage facility in Patent Document 1 includes an article storage rack (11) and a stacker crane (17) that transports articles (W) along a rack front surface, which is the front surface of the article storage rack (11). The article storage rack (11) includes a large number of spaces partitioned in the lengthwise direction of the article storage rack (11) and the vertical direction, and each of the spaces includes a front shelf (12) that faces the stacker crane (17) and a back shelf (13) located rearward of the front shelf (12). The front shelf (12) and the back shelf (13) arranged in each of the spaces make up a front and rear shelf set (14).

As described in paragraph [0003] in Patent Document 1, in the case where the article storage rack (11) includes front and rear shelf sets (14), usually, an article (W) that is stored first is stored on the back shelf (13), and an article (W) that is stored at a later time is stored on the front shelf (12). As described in paragraph [0027] in Patent Document 1, if a retrieval target article (Wa), which is an article (W) that is to be retrieved, is located on the back shelf (13), the article (W) on the front shelf (12) is first moved to another front and rear shelf set (14), and then the retrieval target article (Wa) is retrieved.

Patent Document

Patent Document 1: JP 2007-238302A

As described above, in the article storage facility disclosed in Patent Document 1, the storage sections provided in the storage rack (in Patent Document 1, the front and rear shelf sets provided in the article storage rack) are each configured such that a plurality of articles (two articles in Patent Document 1) can be stored next to each other in the rack depth direction. If an article is stored in front of a retrieval target article that is to be retrieved from the storage shelf, rearrangement processing is performed in order to move the front article (in Patent Document 1, the article on the front shelf) to another storage section. Such rearrangement processing can lead to a decrease in the efficiency of article retrieval, and thus it is desirable to keep the frequency of execution of rearrangement processing as low as possible.

However, although Patent Document 1 describes a priority order for storage positions for when a retrieved article is to be re-stored, there is no description regarding storage positions for when storing an article other than an article that is to be re-stored, and there is no disclosure of technology for reducing the frequency of execution of the rearrangement processing for the storage rack overall.

SUMMARY OF THE INVENTION

In view of the foregoing, there is desire for realization of technology for, when the storage sections of a storage rack are configured such that a plurality of articles can be stored next to each other in the rack depth direction, reducing the frequency of execution of rearrangement processing for the storage rack overall.

An article storage facility according to an aspect of the present disclosure is an article storage facility including: a storage rack including a plurality of storage sections; a transport device configured to transport an article along a rack front surface, which is a front surface of the storage rack; and a control system configured to control the transport device, wherein with a rack depth direction being a direction orthogonal to the rack front surface, a rack front surface side being a side corresponding to the rack front surface in the rack depth direction, and a rack back surface side being a side opposite to the rack front surface side in the rack depth direction, the storage sections are each configured to store a plurality of the articles next to each other in the rack depth direction, the transport device includes a transfer device configured to retrieve the articles from the storage sections and store the articles in the storage sections by moving the articles in the rack depth direction, from a position on the rack front surface side of the storage rack, the control system includes a storage unit configured to store article type information and retrieval frequency information in association with each other, the article type information indicating an article type for each of the articles, and the retrieval frequency information indicating a retrieval frequency for each of the article types, the plurality of articles include a high frequency article which is an article of an article type for which the retrieval frequency is a predetermined high frequency threshold value or more, and a normal article which is an article of an article type for which the retrieval frequency is less than the high frequency threshold value, each of the storage sections has a plurality of storage positions at which the articles are stored, the plurality of storage positions including at least one first storage position, which is a storage position closest to the rack front surface side, and at least one normal storage position, which is a storage position on the rack back surface side of the first storage position, and the control system controls the transport device so as to preferentially store the high frequency article at the first storage position and preferentially store the normal article at the normal storage position.

An article storage method according to an aspect of the present disclosure is an article storage method to be executed by a control system in an article storage facility, the article storage facility including: a storage rack including a plurality of storage sections; a transport device configured to transport an article along a rack front surface, which is a front surface of the storage rack; and the control system configured to control the transport device, and the article storage method including a step of controlling the transport device so as to preferentially store a high frequency article at a first storage position and preferentially store a normal article at a normal storage position, a rack depth direction being a direction orthogonal to the rack front surface, a rack front surface side being a side corresponding to the rack front surface in the rack depth direction, and a rack back surface side being a side opposite to the rack front surface side in the rack depth direction, the storage sections each being configured to store a plurality of the articles next to each other in the rack depth direction, the transport device including a transfer device configured to retrieve the articles from the storage sections and store the articles in the storage sections by moving the articles in the rack depth direction, from a position on the rack front surface side of the storage rack, the plurality of articles including the high frequency article which is an article of an article type for which the retrieval frequency is a predetermined high frequency threshold value or more, and the normal article which is an article of an article type for which the retrieval frequency is less than the high frequency threshold value, based on information in which article type information and retrieval frequency information are associated with each other, the article type information indicating an article type for each of the articles, and the retrieval frequency information indicating a retrieval frequency for each of the article types, and each of the storage sections having a plurality of storage positions at which the articles are stored, the plurality of storage positions including at least one first storage position, which is a storage position closest to the rack front surface side, and at least one normal storage position, which is a storage position on the rack back surface side of the first storage position.

An article storage program according to an aspect of the present disclosure is an article storage program for controlling an article storage facility, the article storage facility including: a storage rack including a plurality of storage sections; a transport device configured to transport an article along a rack front surface, which is a front surface of the storage rack; and a control system configured to control the transport device, and the article storage program causing a computer in the control system to realize a function of controlling the transport device so as to preferentially store a high frequency article at a first storage position and preferentially store a normal article at a normal storage position, a rack depth direction being a direction orthogonal to the rack front surface, a rack front surface side being a side corresponding to the rack front surface in the rack depth direction, and a rack back surface side being a side opposite to the rack front surface side in the rack depth direction, the storage sections each being configured to store a plurality of the articles next to each other in the rack depth direction, the transport device including a transfer device configured to retrieve the articles from the storage sections and store the articles in the storage sections by moving the articles in the rack depth direction, from a position on the rack front surface side of the storage rack, the plurality of articles including the high frequency article which is an article of an article type for which the retrieval frequency is a predetermined high frequency threshold value or more, and the normal article which is an article of an article type for which the retrieval frequency is less than the high frequency threshold value, based on information in which article type information and retrieval frequency information are associated with each other, the article type information indicating an article type for each of the articles, and the retrieval frequency information indicating a retrieval frequency for each of the article types, and each of the storage sections having a plurality of storage positions at which the articles are stored, the plurality of storage positions including at least one first storage position, which is a storage position closest to the rack front surface side, and at least one normal storage position, which is a storage position on the rack back surface side of the first storage position.

According to these configurations, each storage section of the storage rack is capable of storing a plurality of articles next to each other in the rack depth direction, and therefore compared with the case where only one article is stored in a storage section, it is possible to increase the article storage rate per unit of volume, and it is also possible to keep the cost of the transport device low relative to the number of articles that can be stored. Also, according to the above configuration, taking into account the retrieval frequency of each type of article, it is possible to preferentially store the high frequency article at the first storage position and preferentially store the normal article at the normal storage position. In other words, a high frequency article having a relatively high retrieval frequency can be preferentially stored at a position where rearrangement processing is not required for retrieval from the storage section, or in the case where rearrangement processing is required, a position where fewer articles are subjected to rearrangement processing (i.e., a position where rearrangement processing needs to be performed fewer times). This makes it possible to keep the frequency of execution of the rearrangement processing low for the storage rack overall.

Note that a high frequency article having a relatively high retrieval frequency is likely to be stored in and retrieved from a storage section more often than a normal article having a relatively low retrieval frequency. According to this configuration, a high frequency article that is likely to be stored in and retrieved from a storage section frequently is preferentially stored at the first storage position where the transfer time is likely to be shorter due to a shorter distance of transfer by the transfer device. Therefore, there is also an advantage that the time required for the storage and retrieval of articles can be easily shortened for the storage rack overall.

Further characteristics and advantages of the article storage facility, the article storage method, and the article storage program will become clear from the following description of embodiments with reference to the drawings.

BRIEF DESCRIPTION OF THE DRAWINGS

The terms FIG., FIGS., Figure, and Figures are used interchangeably in the specification to refer to the corresponding figures in the drawings.

FIG. 13 is a control flow diagram.

DESCRIPTION OF THE INVENTION

Embodiments of an article storage facility will be described below with reference to the drawings. Note that various technical features of the article storage facility described below can also be applied to an article storage method in the article storage facility and an article storage program for controlling the article storage facility, and such method, such program, and a storage medium (e.g., an optical disk, a flash memory, etc.) in which such a program is stored are also disclosed by this specification.

Figure 1:
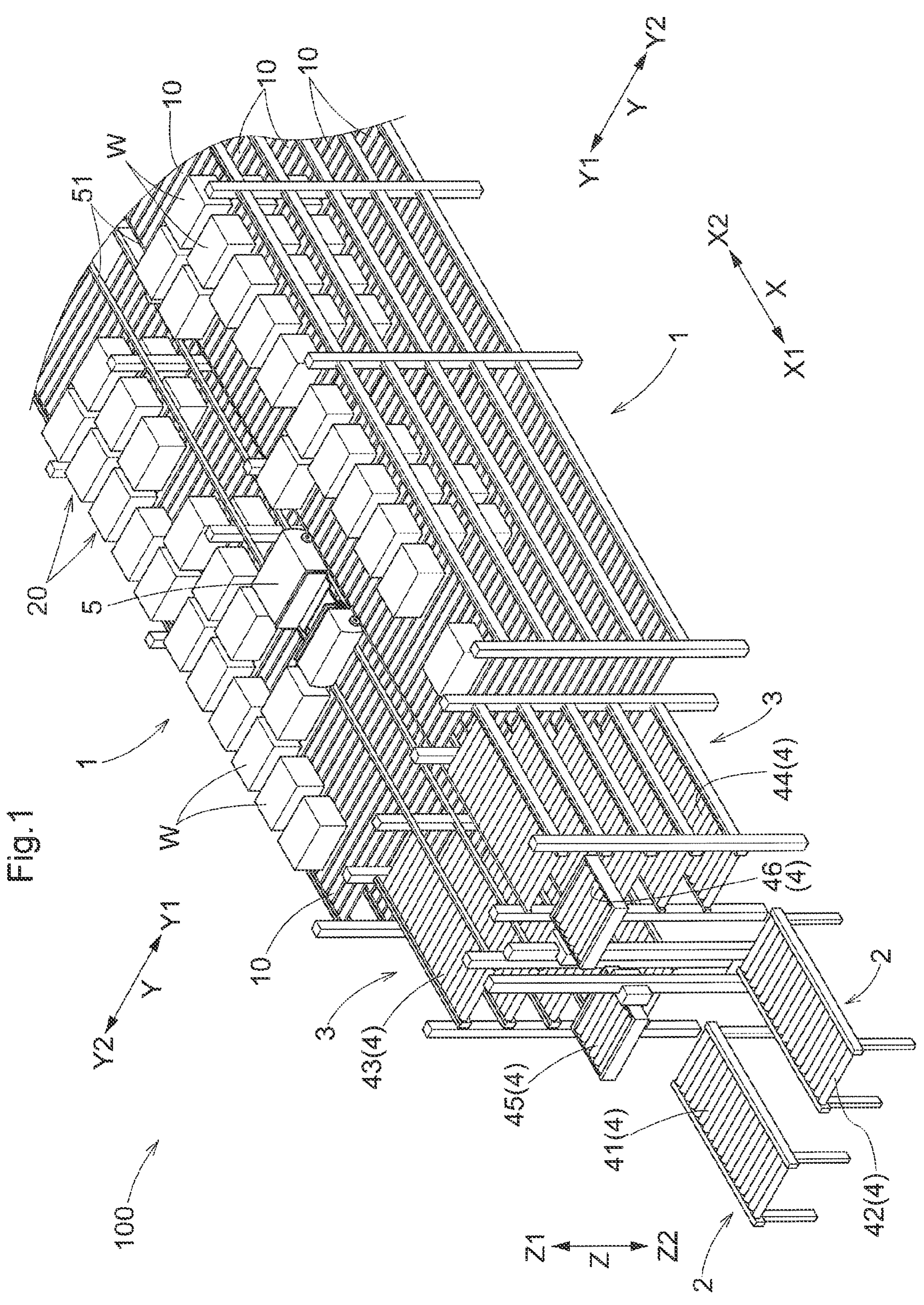
FIG. 1 is a perspective view of part of an article storage facility.
Figure 2:
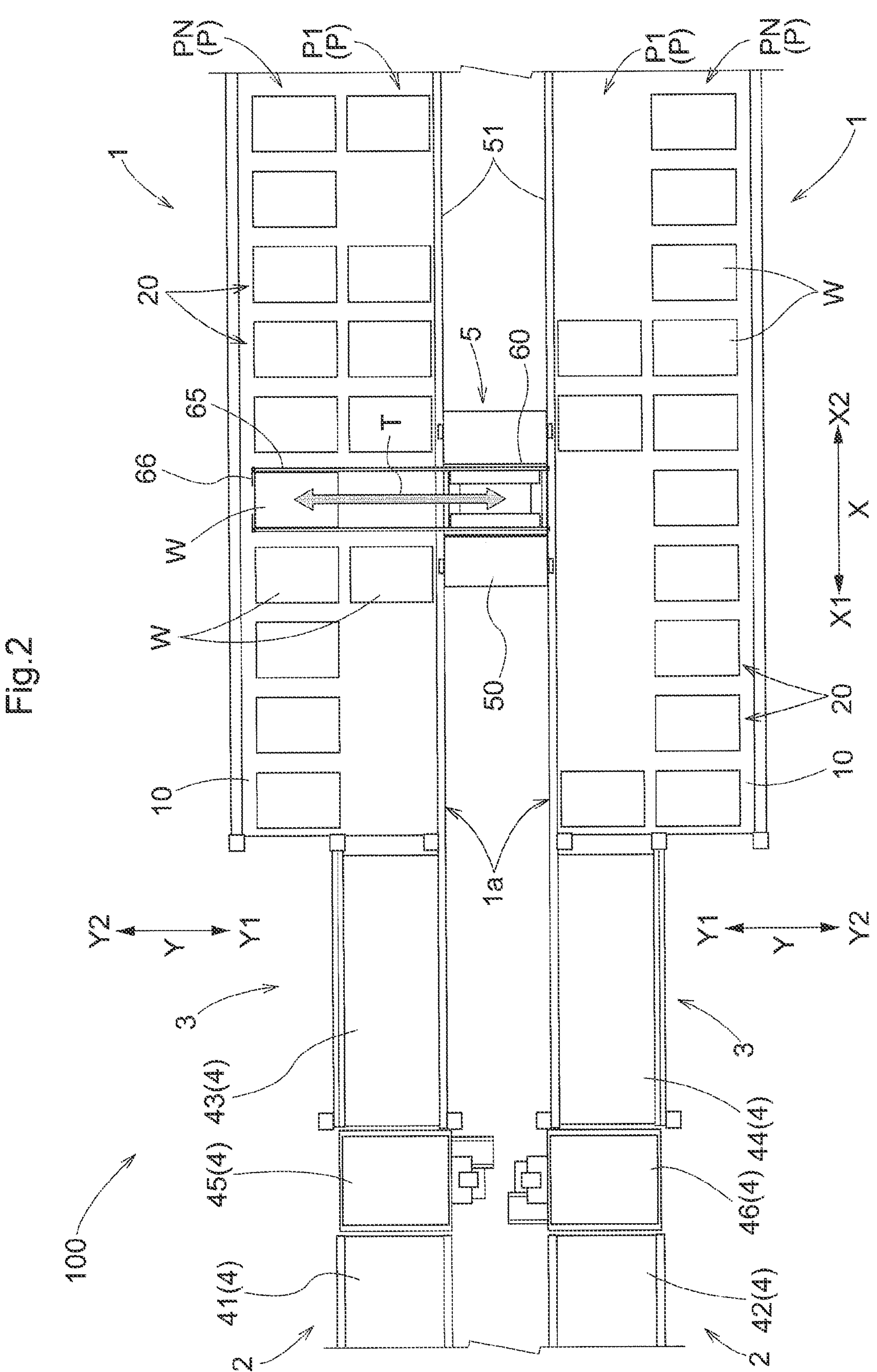
FIG. 2 is a plan view of part of the article storage facility.

As shown in FIGS. 1 and 2, an article storage facility 100 includes a storage rack 1 in which a plurality of storage sections 20 are provided, a transport device 5 that transports articles W along a rack front surface 1*a*, which is the front surface of the storage rack 1, and a control system 30 (see FIG. 12) that controls the transport device 5. The transport device 5 transports the articles W along the rack front surface 1*a* by moving along the rack front surface 1*a* while holding the articles W. The rack front surface 1*a* is the surface of the storage rack 1 on the side on which articles W are carried in and carried out. In other words, the rack front surface 1*a* is the surface of the storage rack 1 on the side on which the transport device 5 is arranged. The rack front surface 1*a* is at least a virtually defined surface. In the present embodiment, the rack front surface 1*a* is an imaginary vertical plane that includes end portions of shelves 10 of the storage rack 1 on a rack front surface side Y1, which will be described later.

Although the present invention is not limited to the following configuration, in the present embodiment, the article storage facility 100 includes a pair of storage racks 1 arranged such that the rack front surfaces 1*a* thereof face each other, and the transport device 5 moves between the storage racks 1 along the pair of rack front surfaces 1*a* (the rack front surface 1*a* of one storage rack 1 and the rack front surface la of the other storage rack 1). In the following, no distinction is made between the pair of storage racks 1 in the description thereof, except when it is necessary to distinguish between the pair of storage racks 1.

Here, a rack depth direction Y is the direction orthogonal to the rack front surface 1*a*, a rack front surface side Y1 is the side corresponding to the rack front surface 1*a* in the rack depth direction Y, and a rack back surface side Y2 is the side opposite to the rack front surface side Y1 in the rack depth direction Y. In the present embodiment, the rack front surface 1*a* extends along the vertical plane, and therefore the rack depth direction Y is the horizontal direction. As described above, in the present embodiment, the article storage facility 100 includes the pair of storage racks 1 arranged such that the rack front surfaces 1*a* thereof face each other. As shown in FIGS. 1 and 2, the rack front surface side Y1 and the rack back surface side Y2 are defined separately for each of the two storage racks 1, and thus the rack front surface side Y1 of one storage rack 1 and the rack front surface side Y1 of the other storage rack 1 are on opposite sides in the rack depth direction Y.

Each of the storage racks 1 includes a plurality of storage sections 20. As shown in FIGS. 1 and 2, in the present embodiment, the storage rack 1 includes a plurality of storage sections 20 arranged next to each other in a rack width direction X. The rack width direction X is orthogonal to the rack depth direction Y. In the present embodiment, the rack width direction X is orthogonal to both the rack depth direction Y and an up-down direction Z (vertical direction). A first side X1 is one side in the rack width direction X, and a second side X2 is the other side (the side opposite to the first side X1) in the rack width direction X.

In the present embodiment, the storage rack 1 includes storage sections 20 at a plurality of positions in the up-down direction Z. Specifically, the storage rack 1 includes a row of storage sections 20 arranged next to each other in the rack width direction X, at each of a plurality of positions in the up-down direction Z. In other words, a plurality of storage sections 20 are arranged in rows in the rack width direction X and in levels in the up-down direction Z. Note that the storage sections 20 included in the storage rack 1 do not necessarily need to be physically partitioned from each other, and a configuration is possible in which the positions and widths of the storage sections 20 can be changed. For example, it may be possible to change the positions and the widths of the storage sections 20 in the rack width direction X.

In the example shown in FIGS. 1 and 2, the storage rack 1 includes shelves 10 that support the articles W (specifically, supports articles from a lower side Z2 in the up-down direction Z). In this example, each of the shelves 10 is plate-shaped (including the case where the shelf 10 is constituted by a collection of a plurality of members so as to be plate-shaped overall). The articles W are stored in the storage rack 1 in the state of being supported by the shelves 10. Each of the shelves 10 has a sufficient size in the rack width direction X for supporting a plurality of articles W arranged in the rack width direction X, and thus a group of storage sections 20 arranged next to each other in the rack width direction X is formed by a shelf 10. The size of each storage section 20 in the rack depth direction Y is determined according to the size of the shelf 10 in the rack depth direction Y. In the example shown in FIGS. 1 and 2, the storage rack 1 includes shelves 10 at a plurality of positions in the up-down direction Z, and thus a group of storage sections 20 arranged next to each other in the rack width direction X is formed at each of a plurality of positions in the up-down direction Z.

As shown in FIGS. 1 and 2, the storage sections 20 are each capable of storing a plurality of articles W next to each other in the rack depth direction Y. In other words, the articles handled in this article storage facility 100 are the articles W having a size that allows a plurality of articles W to be stored next to each other in the rack depth direction Y in each of the storage sections 20. Although the articles W handled by the article storage facility 100 may include large articles having a size according to which a storage section 20 is completely occupied by one article W, such large articles will not be taken into consideration below, and the following describes a case in which a plurality of articles W are stored next to each other in the rack depth direction Y in each of the storage sections 20.

Here, each of the storage sections 20 has a plurality of storage positions P at which the articles W are stored, and the storage positions P include at least one first storage position P1, which is a storage position closest to the rack front surface side Y1, and at least one normal storage position PN, which is a storage position on the rack back surface side Y2 of the first storage position P1. In the present embodiment, as shown in FIG. 2, two articles W can be stored next to each other in the rack depth direction Y in each of the storage sections 20. In other words, each of the storage sections 20 is capable of storing two articles W next to each other in the rack depth direction Y. Two storage positions P are set in each of the storage sections 20, the first storage position P1 is the one storage position P that is on the rack front surface side Y1, and the normal storage position PN is the other storage position P that is on the rack back surface side Y2. In this manner, in the present embodiment, one first storage position P1 and one normal storage position PN are set in each of the storage sections 20.

As shown in FIG. 2, the transport device 5 includes a transfer device 60 that retrieves the articles W from the storage sections 20 and stores the articles W in the storage sections 20 by moving the articles W in the rack depth direction Y, from a position on the rack front surface side Y1 of the storage rack 1. In other words, the transfer device 60 transfers the articles W between the transport device 5 and the storage sections 20 by moving the articles W in the rack depth direction Y, from a position on the rack front surface side Y1 of the storage rack 1. Specifically, the transfer device 60 retrieves an article W from a storage section 20 by moving the article W stored in the storage section 20 toward the rack front surface side Y1, from a position on the rack front surface side Y1 of the storage rack 1. The article W retrieved from the storage section 20 is held by the transport device 5 by being supported by a support section of the transport device 5 (e.g., a support section of the transfer device 60 or a support section of a later-described travel section 50 described later). Also, the transfer device 60 stores an article W in a storage section 20 by moving the article W held on the transport device 5 toward the rack back surface side Y2, from a position on the rack front surface side Y1 of the storage rack 1.

The transfer device 60 can perform article W storage and retrieval (article W storage and article W retrieval) at any of the storage positions P (in the present embodiment, at both the first storage position P1 and the second storage position P2) in each of the storage sections 20. As described above, in the present embodiment, the article storage facility 100 includes a pair of storage racks 1, and the transport device 5 is capable of using the transfer device 60 to store articles W and retrieve articles W from any of the storage sections 20 of the pair of the storage racks 1.

In the example shown in FIG. 2, the transfer device 60 moves an article W in the rack depth direction Y by using an extension and retraction mechanism 65 to move a contact section 66, which is for coming into contact with the article W, forward and rearward in the rack depth direction Y (forward toward the rack back surface side Y2 and rearward toward the rack front surface side Y1). Specifically, the transfer device 60 stores an article W in a storage section 20 by moving the contact section 66 forward toward the rack back surface side Y2 such that the article W held by the transport device 5 is pushed toward the rack back surface side Y2 by the contact section 66. Also, the transfer device 60 retrieves an article W from a storage section 20 by moving the contact section 66 rearward toward the rack front surface side Y1 such that the article W stored in the storage section 20 is pulled toward the rack front surface side Y1 by the contact section 66. For the sake of simplicity, the contact section 66 used to push the article W toward the rack back surface side Y2 is not shown in FIG. 2.

Note that the configuration of the transfer device 60 is not limited to this, and it is also possible to use, as the transfer device 60, a fork-type transfer device in which a support body, which is for supporting an article W from the lower side Z2, is moved forward and rearward in the rack depth direction Y, or a clamp-type transfer device in which a clamp, which is for clamping an article W, is moved forward and rearward in the rack depth direction Y, for example.

The transport device 5 includes a travel section 50 that travels along the rack front surface 1*a*, and the transfer device 60 is supported by the travel section 50. In the present embodiment, the travel section 50 travels along the rack front surface 1*a* by traveling in the rack width direction X. The transport device 5 thus transports articles W in the rack width direction X along the rack front surface 1*a*. In the present embodiment, a travel path is formed for the transport device 5 (specifically, the travel section 50) for each level in the storage racks 1, and the number of travel paths is the same as the number of levels in the storage racks 1 (in other words, the number of storage sections 20 in a column in the up-down direction Z). In FIG. 1, only the transport device 5 disposed on the uppermost travel path is shown. In the example shown in FIGS. 1 and 2, each travel path for a transport device 5 is formed by a pair of rails 51 that are arranged at the same position in the up-down direction Z and spaced apart in the rack depth direction Y. Although this will not be described in detail, each of the travel sections 50 includes travel wheels that roll on the travel surface of the rails 51 (the surface facing the upper side Z1 in the up-down direction Z), and one or more of the travel wheels is driven to rotate by a drive device such as an electric motor such that the travel section 50 travels along the rails 51.

As shown in FIGS. 1 and 2, the article storage facility 100 includes a storage and retrieval section 3 to which articles W to be stored in the storage racks 1 are carried in and from which articles W retrieved from the storage racks 1 are carried out. In other words, articles W to be stored in the storage racks 1 are carried into the storage and retrieval section 3 from a warehousing line or the like. Also, an article W retrieved from a storage rack 1 is carried out from the storage and retrieval section 3 to a delivery line or the like. Note that articles W may be carried in and out of the storage and retrieval section 3 by a transport vehicle, a worker, or the like.

The transport device 5 transports articles W between the storage and retrieval section 3 and the storage sections 20. Specifically, the transport device 5 transports an article W to be stored in the storage rack 1 from the storage and retrieval section 3 to a storage section 20 where the article W is to be stored. Also, an article W retrieved from the storage rack 1 is transported by the transport device 5 from a storage section 20 to the storage and retrieval section 3. When an article W is transferred between the transport device 5 and the storage and retrieval section 3, such transfer may be performed by the transfer device 60 of the transport device 5, may be performed by a device provided in the storage and retrieval section 3, or may be performed by both the transfer device 60 of the transport device 5 and the device provided in the storage and retrieval section 3. When the transfer device 60 of the transport device 5 is used to transfer an article W between the transport device 5 and the storage and retrieval section 3, the transfer device 60 transfers the article W arranged in the storage and retrieval section 3 to the transport device 5 by moving the article W in the storage and retrieval section 3 toward the rack front surface side Y1. Also, the transfer device 60 moves the article W held on the transport device 5 to the storage and retrieval section 3 by moving the article W from the transport device 5 toward the rack back surface side Y2.

In the example shown in FIGS. 1 and 2, a relay device 4 carries articles W into the storage and retrieval section 3 and carries articles W out from the storage and retrieval section 3. The relay device 4 includes a first conveyor 41, a second conveyor 42, a third conveyor 43, a fourth conveyor 44, a first lift device 45, and a second lift device 46, and transports articles W between a carry in and out section 2 and the storage and retrieval section 3. The first conveyor 41 is a carry out conveyor for transporting articles W from the carry in and out section 2 to a delivery line or the like, and the second conveyor 42 is a carry-in conveyor for transporting articles W from a warehousing line or the like to the carry in and out section 2. A roller conveyor, a belt conveyor, or the like can be used as the first conveyor 41, the second conveyor 42, the third conveyor 43, and the fourth conveyor 44.

The third conveyor 43 and the fourth conveyor 44 are provided at a plurality of positions in the up-down direction Z in the storage and retrieval section 3 (specifically, at heights corresponding to each level in the storage rack 1), and the transport device 5 transports articles W between the storage sections 20 and the third conveyor 43 that are at the same level as each other, and transports articles 4 between the storage sections 20 and the fourth conveyor 44 that are at the same level as each other. The first lift device 45 includes a support section that can support an article W while being raised and lowered, and transports articles W between the first conveyor 41 and any of the third conveyors 43. Also, the second lift device 46 includes a support section that can support an article W while being raised and lowered, and transports articles W between the second conveyor 42 and any of the fourth conveyors 44.

The article W retrieved from the storage rack 1 is transported by the transport device 5 to the third conveyor 43 arranged in the storage and retrieval section 3, and then transported from the third conveyor 43 to the first conveyor 41 by the first lift device 45. In other words, the third conveyor 43 is used as a retrieval section (specifically, a retrieval conveyor) in the storage and retrieval section 3. Also, an article W to be stored in the storage rack 1 is transported from the second conveyor 42 to the fourth conveyor 44 by the second lift device 46, and then transported from the fourth conveyor 44 to a storage section 20 by the transport device 5. In other words, the fourth conveyor 44 is used as a storage section (specifically, a storage conveyor) in the storage and retrieval section 3. Note that a configuration is also possible in which the third conveyor 43 and the fourth conveyor 44 can be used as either the storage section or the retrieval section depending on the state of the article storage facility 100 at the time.

Figure 12:
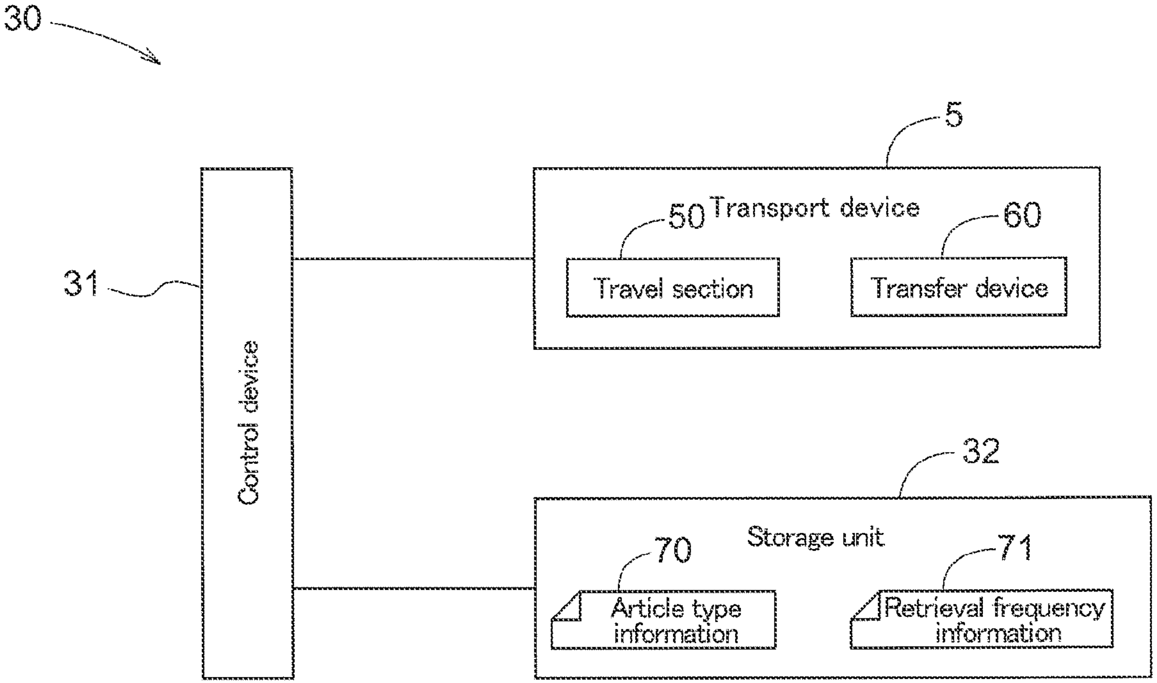
FIG. 12 is a control block diagram.

As shown in FIG. 12, the control system 30 includes a control device 31 that controls operation of the transport device 5. The control device 31 controls operation of the travel section 50 so as to perform travel operations, and also controls operation of the transfer device 60 so as to perform transfer operations. Specifically, the transport device 5 includes a controller (device controller), and this controller controls drive power sources (e.g., electric motors or solenoids) provided in various sections in accordance with commands from the control device 31, thus controlling operations of the transport device 5 (e.g., traveling operations performed by the travel section 50 and transfer operations performed by the transfer device 60). Note that instead of being configured as a single piece of hardware, the control device 31 may be configured as a collection of pieces of hardware (a plurality of separate pieces of hardware) that can communicate with each other wirelessly or by wire. Also, at least a portion of the control device 31 may be provided in the transport device 5.

The control device 31 includes an arithmetic processing unit such as a CPU (Central Processing Unit), and a main storage device such as a RAM (Random Access Memory) or a ROM (Read Only Memory) that can be referred to by the arithmetic processing unit. Functions of the control device 31 (e.g., a function of controlling the transport device 5) are realized through cooperation between hardware included in the control device 31 and a program executed on hardware such as the arithmetic processing unit. Specifically, functions of the control device 31 are realized by the control device 31 executing a program stored in a storage device (main storage device, separately provided storage unit 32, or the like). In other words, a program (e.g., an article storage program) for causing a computer (the computer of the control system 30) to realize functions of the control device 31 is stored in a storage device that can be referred to by the computer. This program is provided by a storage medium or via a communication network, for example. The provided program is then stored in a storage device that can be referred to by the computer. In the present embodiment, the control device 31 (specifically, the arithmetic processing unit included in the control device 31) functions as the "computer."

As shown in FIG. 12, the control system 30 includes a storage unit 32. The control device 31 is capable of extracting data from the storage unit 32. The storage unit 32 includes a storage medium in which information can be stored and rewritten, such as a flash memory or a hard disk. The storage unit 32 may be provided in a device (e.g., a server) that can communicate with the control device 31 wirelessly or by wire. Also, the storage unit 32 may be integrated in the control device 31. In other words, the control device 31 may include the storage unit 32.

There are a plurality of types of articles W handled by the article storage facility 100, which have different retrieval frequencies (frequency of being retrieved from the storage rack 1). Here, "type of article W" means the type when the article W is classified according to criteria related to the retrieval frequency. For example, in the case where the article W is a container that stores an item, the retrieval frequency of the article W changes depending on the type of item, and thus the type of the item is the type of the article W. As shown in FIG. 12, the storage unit 32 stores article type information 70 indicating the types of articles W, and retrieval frequency information 71 indicating the retrieval frequency for each type (for each type of article).

In the case where the article W is a container that stores an item, the article type indicated in the article type information 70 is an article name code corresponding to the item, for example. The retrieval frequency indicated in the retrieval frequency information 71 is a value corresponding to the number of retrievals (or the number of retrieved containers) per unit of time for each type of article, or a value corresponding to the reciprocal of the average duration of storage (average length of stay) in the storage rack 1 for each type of article, for example. The retrieval frequency for each type of article can be set based on actual values, can be set based on predicted values, or can be set based on both actual values and predicted values, for example.

For example, the article storage facility 100 can be applied to a picking facility where the articles W retrieved from the storage rack 1 are supplied to a picking location where picking operations are performed. After the picking operations have been performed, the articles W are re-stored in the storage rack 1, for example. In the case where the article storage facility 100 is applied to a picking facility in this way, the article W is a container (e.g., a container box or a cardboard box) that stores an item (a product or the like), and at the picking location, the item is retrieved from the article W in the picking operation. In this case, the articles W storing popular items tend to have a higher retrieval frequency than other articles W. Also, even among articles of the same type, if the item is a seasonal product, the retrieval frequency the article W storing the item tends to be higher during the busy season than during the off-season. When considering changes in the retrieval frequency of article W depending on the time such as the season, it is preferable that even articles W that store the same type of item are handled as different types of article W depending on the season.

Here, a high frequency article WH is an article W of a type whose retrieval frequency is a predetermined high frequency threshold value or higher, and a normal article WN is an article W of a type whose retrieval frequency is less than the high frequency threshold value. Classification of articles W into high frequency articles WH and normal articles WN is performed based on information stored in the storage unit 32, specifically, based on information in which the article type information 70 and the retrieval frequency information 71 are associated with each other. Such classification based on the retrieval frequency of the articles W may be performed using a technique such as ABC analysis.

Here, as shown in FIGS. 3 to 11, a first-state storage section 21 is a storage section 20 in which a normal article WN is stored at the normal storage position PN, and in which an article W is not stored at the first storage position P1. Also, a second-state storage section 22 is a storage section 20 in which a high frequency article WH is stored at the normal storage position PN, and in which an article W is not stored at the first storage position P1. Furthermore, a third-state storage section 23 is a storage section 20 in which an article W is not stored at the first storage position P1, and in which an article W is not stored at the normal storage position PN. Furthermore, a fourth-state storage section 24 is a storage section 20 in which articles W are stored at the first storage position P1 and the normal storage position PN.

In FIGS. 3 to 11, in order to facilitate distinguishing between high frequency articles WH and normal articles WN, the rectangular frame lines representing high frequency articles WH are thicker than the rectangular frame lines representing normal articles WN. Also, FIGS. 3 to 8 chronologically show scenes in which 19 articles W are sequentially stored in the storage racks 1 (in this case, the pair of storage racks 1), where higher figure numbers indicate later times. The numbers inside the rectangles representing the articles W (high frequency articles WH and normal articles WN) indicate the order in which the articles W are stored in the storage racks 1.

The control system 30 controls the transport device 5 to preferentially store a high frequency article WH at a first storage position P1, and to preferentially store a normal article WN at a normal storage position PN. In the present embodiment, the control system 30 stores the articles W in the storage racks 1 in accordance with the procedure shown in FIG. 13, and controls the transport device 5 so as to preferentially store a high frequency article WH at a first storage position P1 and preferentially store a normal article WN at a normal storage position PN. Hereinafter, a procedure of the article storage method executed by the control system 30 of the present embodiment will be described with reference to FIG. 13. Note that the steps shown in FIG. 13 are executed by a computer (arithmetic processing unit) included in the control system 30 (the control device 31 in the present embodiment).

In the case where the target article (the article W to be stored in a storage rack 1, which similarly applies hereinafter) is a high frequency article WH (step #01: Yes), if a first-state storage section 21 exists (step #02: Yes), the control system 30 controls the transport device 5 so as to store the target article at the first storage position P1 in the first-state storage section 21 (step #03). Furthermore, in the case where the target article is a high frequency article WH (step #01: Yes), if a first-state storage section 21 does not exist and a second-state storage section 22 exists (step #02: No, step #04: Yes), the control system 30 controls the transport device 5 so as to store the target article at the first storage position P1 in the second-state storage section 22 (step #05). Also, in the case where the target article is a high frequency article WH (step #01: Yes), if both a first-state storage section 21 and a second-state storage section 22 do not exist (step #02: No, step #04: No), the control system 30 controls the transport device 5 so as to store the target article at the normal storage position PN in a third-state storage section 23 (step #06).

In the case where the target article is a normal article WN (step #01: No), if a third-state storage section 23 exists (step #07: Yes), the control system 30 controls the transport device 5 so as to store the target article at the normal storage position PN in the third-state storage section 23 (step #08). Also, in the case where the target article is a normal article WN (step #01: No), if a third-state storage section 23 does not exist and a first-state storage section 21 exists (step #07: No, step #09: Yes), the control system 30 controls the transport device 5 so as to store the target article at the first storage position P1 in the first-state storage section 21 (step #10). Also, in the case where the target article is a normal article WN (step #01: No), if both a third-state storage section 23 and a first-state storage section 21 do not exist (step #07: No, step #09: No), the control system 30 controls the transport device 5 so as to store the target article at the first storage position P1 in a second-state storage section 22 (step #11).

Note that here, an example has been described in which, in the case where the target article is a high frequency article WH, if a first-state storage section 21 does not exist and a second-state storage section 22 exists, the control system 30 controls the transport device 5 so as to store the target article at the first storage position P1 in the second-state storage section 22, whereas if both a first-state storage section 21 and a second-state storage section 22 do not exist, the control system 30 controls the transport device 5 so as to store the target article at the normal storage position PN in a third-state storage section 23, but the present invention is not limited to this, and a configuration such as the following is also possible. In the case where the target article is a high frequency article WH, if the first-state storage section 21 does not exist and the third-state storage section 23 exists, the control system 30 controls the transport device 5 so as to store the target article at the normal storage position PN in the third-state storage section 23, whereas if both a first-state storage section 21 and a third-state storage section 23 do not exist, the control system 30 controls the transport device 5 so as to store the target article at the first storage position P1 in a second-state storage section 22.

Figure 3:
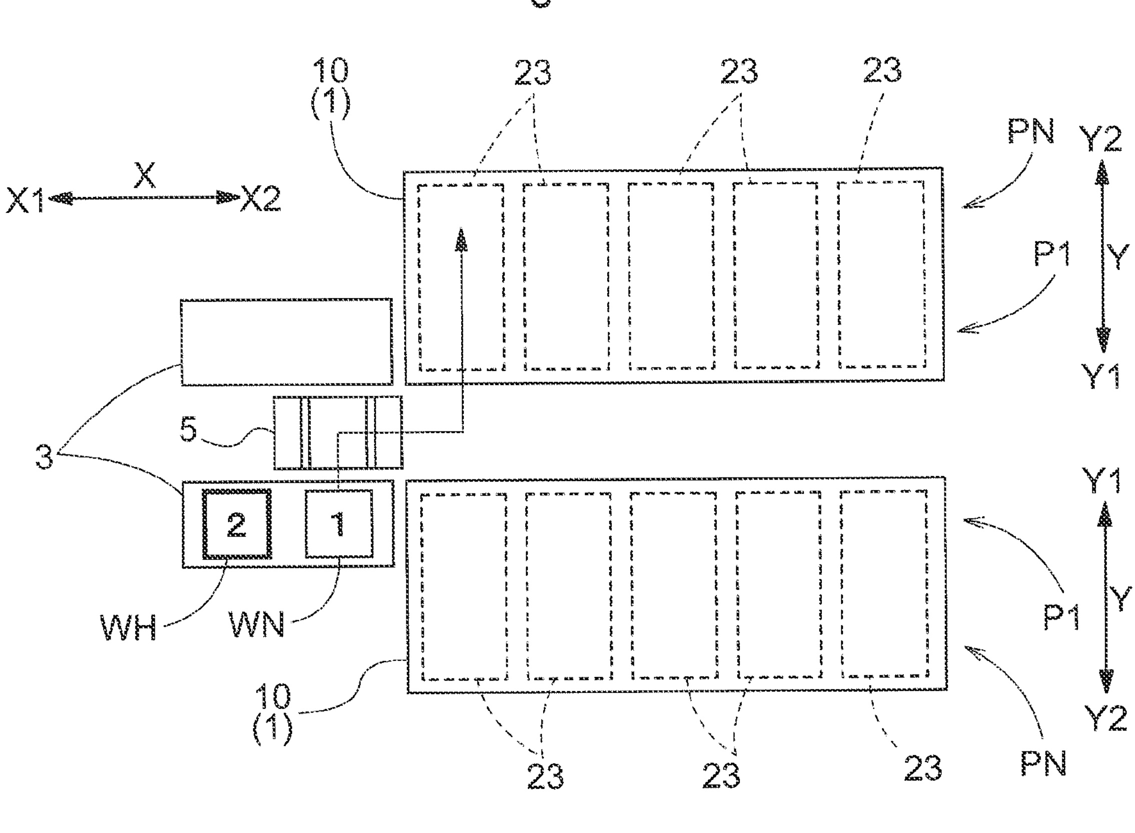
FIG. 3 is a diagram showing an aspect of storage processing.
Figure 4:
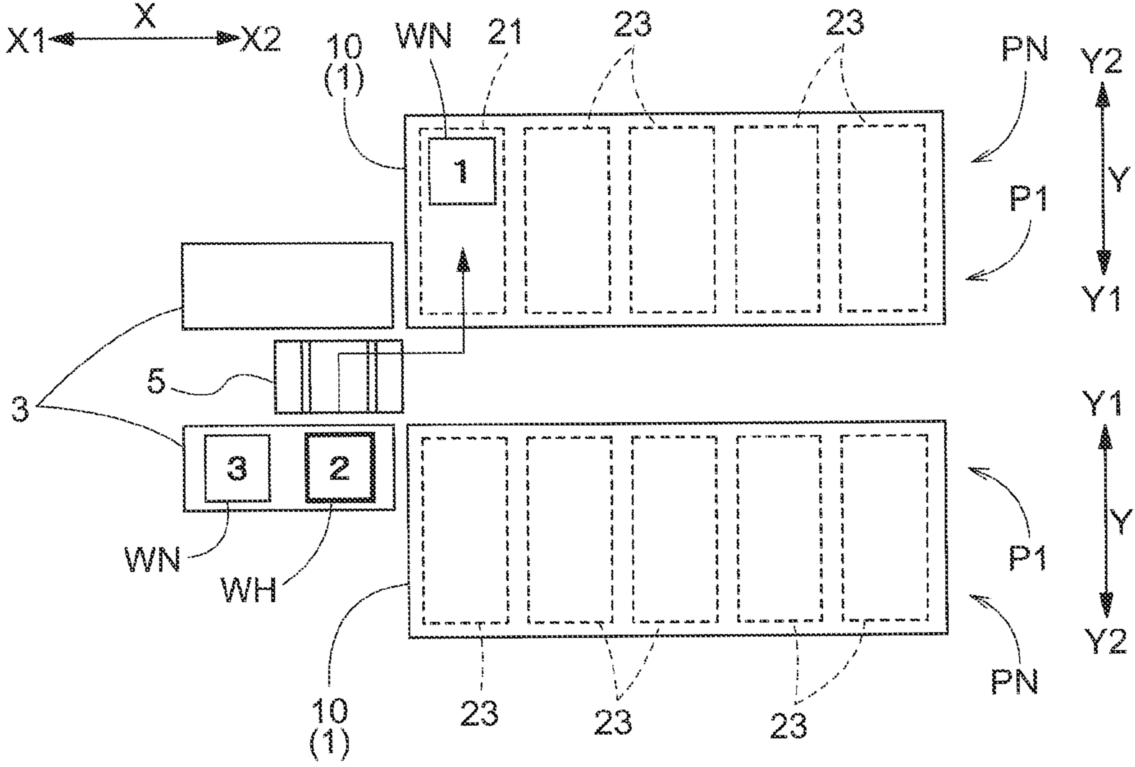
FIG. 4 is a diagram showing an aspect of storage processing.
Figure 5:
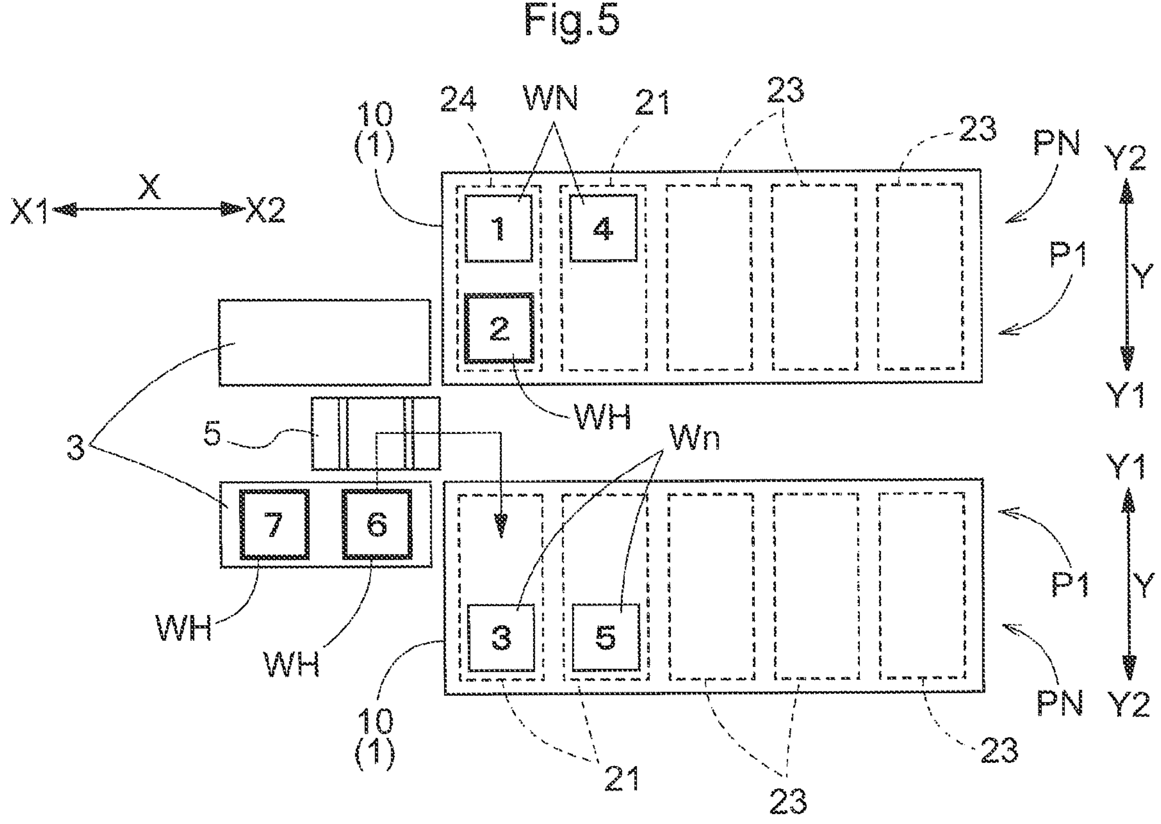
FIG. 5 is a diagram showing an aspect of storage processing.

Next, an example of a scene in which articles W are stored in the storage racks 1 according to the procedure shown in FIG. 13 will be described with reference to FIGS. 3 to 8. As shown in FIG. 3, the first article W to be stored is a normal article WN, and since a third-state storage section 23 exists, the normal article WN is stored at the normal storage position PN in the third-state storage section 23. The third-state storage section 23 in which the normal article WN is stored at the normal storage position PN becomes a first-state storage section 21 (see FIG. 4). As shown in FIG. 4, the article W to be stored second is a high frequency article WH, and since a first-state storage section 21 exists, the high frequency article WH is stored at the first storage position P1 in the first-state storage section 21. The first-state storage section 21 in which the high frequency article WH is stored at the first storage position P1 becomes a fourth-state storage section 24 (see FIG. 5). Thereafter, the articles W up to the tenth article are stored in storage sections 20 according to the procedure shown in FIG. 13.

Figure 6:
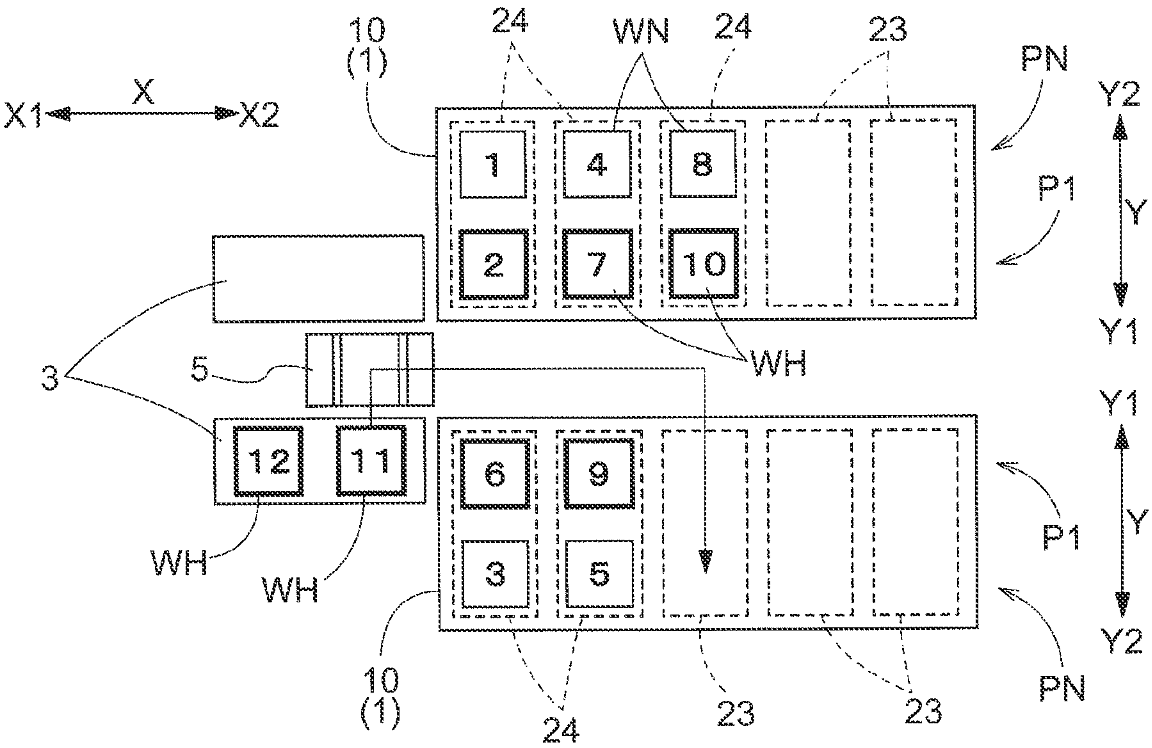
FIG. 6 is a diagram showing an aspect of storage processing.
Figure 7:
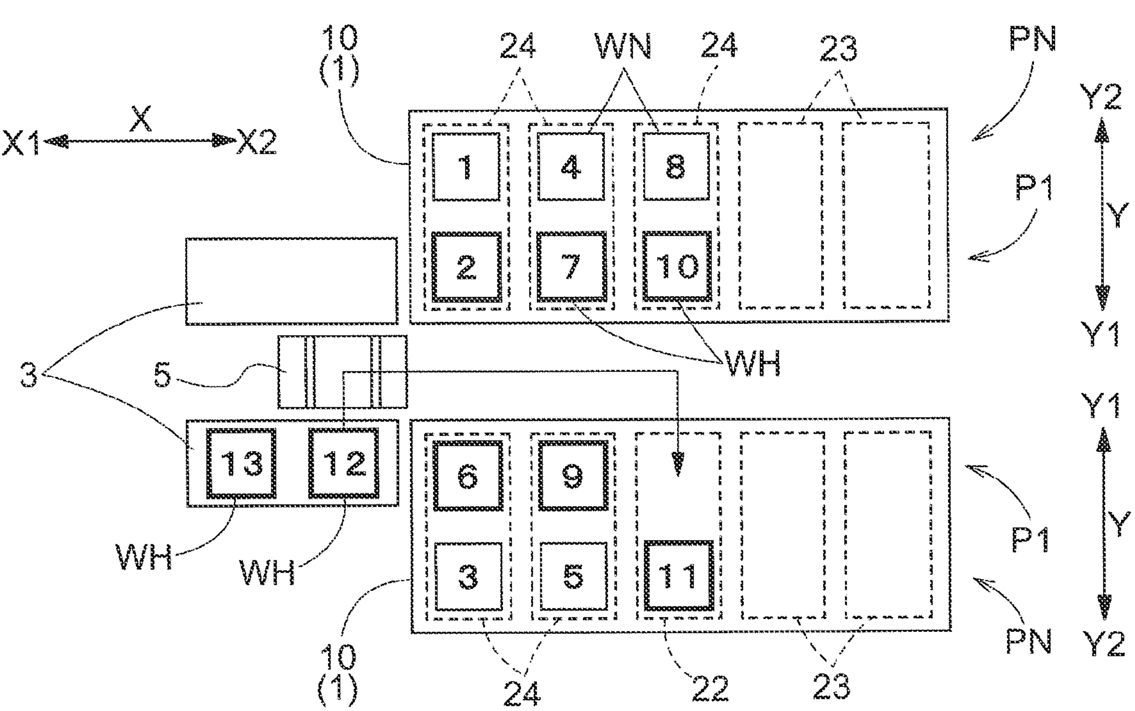
FIG. 7 is a diagram showing an aspect of storage processing.

As shown in FIG. 6, the article W to be stored eleventh is a high frequency article WH, and since both a first-state storage section 21 and a second-state storage section 22 do not exist, the high frequency article WH is stored at the normal storage position PN in a third-state storage section 23. As shown in FIG. 7, the article W to be stored twelfth is a high frequency article WH, and since a first-state storage section 21 does not exist and a second-state storage section 22 exists, the high frequency article WH is stored at the first storage position P1 in the second-state storage section 22. Thereafter, the articles W up to the seventeenth article are stored in storage sections 20 according to the procedure shown in FIG. 13.

Figure 8:
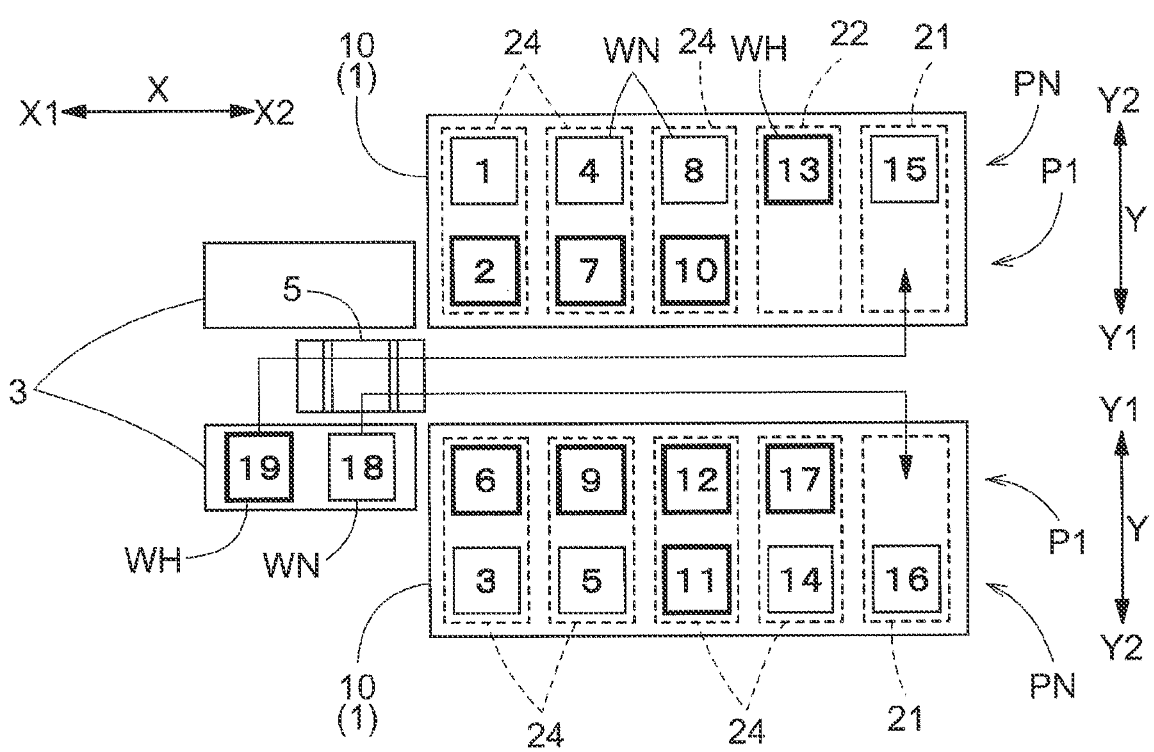
FIG. 8 is a diagram showing an aspect of storage processing.

As shown in FIG. 8, the article W to be stored eighteenth is a normal article WN, and since a third-state storage section 23 does not exist and a first-state storage section 21 exists, the normal article WN is stored at the first storage position P1 in the first-state storage section 21. Furthermore, the article W to be stored nineteenth is a high frequency article WH, and since a first-state storage section 21 exists, the high frequency article WH is stored at the first storage position P1 in the first-state storage section 21.

Note that when storing a high frequency article WH in the storage racks 1, there are cases where there are a plurality of storage sections 20 that can store the high frequency article WH. In the present embodiment, the storage sections 20 that can store a high frequency article WH include the following: if a first-state storage section 21 exists, then that first-state storage section 21; if a first-state storage section 21 does not exist and a second-state storage section 22 exists, then that second-state storage section 22; and if both a first-state storage section 21 and a second-state storage section 22 do not exist, then a third-state storage section 23. Furthermore, when storing a normal article WN in the storage racks 1, there are cases where there are a plurality of storage sections 20 that can store the normal article WN. In the present embodiment, the storage sections 20 that can store a normal article WN include the following: if a third-state storage section 23 exists, then that third-state storage section 23; if a third-state storage section 23 does not exist and a first-state storage section 21 exists, then that first-state storage section 21; and if both a third-state storage section 23 and a first-state storage section 21 do not exist, then a second-state storage section 22.

For example, in the case where a high frequency article WH is to be stored in the storage racks 1, and there are a plurality of storage sections 20 capable of storing the high frequency article WH, the control system 30 controls the transport device 5 so as to preferentially store the high frequency article WH in the storage section 20 that is closest to the storage and retrieval section 3. In the present embodiment, the storage and retrieval section 3 is on the first side X1 of the storage racks 1, and thus the storage section 20 closest to the storage and retrieval section 3 is the storage section 20 closest to the first side X1. In the example shown in FIG. 5, there are three first-state storage sections 21 that can store the sixth high frequency article WH, and the sixth high frequency article WH is stored in the first-state storage section 21 closest to the storage and retrieval section 3 (here, the first-state storage section 21 closest to the first side X1). Also, in the example shown in FIG. 6, there are five third-state storage sections 23 that can store the eleventh high frequency article WH, and the eleventh high frequency article WH is stored in the third-state storage section 23 closest to the storage and retrieval section 3 (here, the third-state storage section 23 closest to the first side X1).

As another example, in the case where a normal article WN is to be stored in the storage racks 1, and there are a plurality of storage sections 20 that can store the normal article WN, the control system 30 may control the transport device 5 so as to preferentially store the normal article WN in the storage section 20 that is farthest from the storage and retrieval section 3. Alternatively, in the case where a normal article WN is to be stored in the storage racks 1, and there are a plurality of storage sections 20 that can store the normal article WN, the control system 30 may control the transport device 5 so as to preferentially store the normal article WN in the storage section 20 that is closest to the storage and retrieval section 3. In the example shown in FIG. 3, there are ten third-state storage sections 23 that can store the first normal article WN, and the first normal article WN is stored in the third-state storage section 23 closest to the storage and retrieval section 3 (here, the third-state storage section 23 closest to the first side X1).

Next, rearrangement processing will be described. Letting a retrieval target article W1 be an article W that is to be retrieved from one of the storage racks 1, and letting a movement target article W2 be an article W stored on the rack front surface side Y1 of the retrieval target article W1 in the storage section 20 storing the retrieval target article W1 (see FIGS. 9 to 11), rearrangement processing for moving the movement target article W2 to another storage section 20 is performed before retrieving the retrieval target article W1 from the storage rack 1. Note that, in order to perform such rearrangement processing, there needs to be at least one storage section 20 in which an article W is not stored at the first storage position P1.

Figure 9:
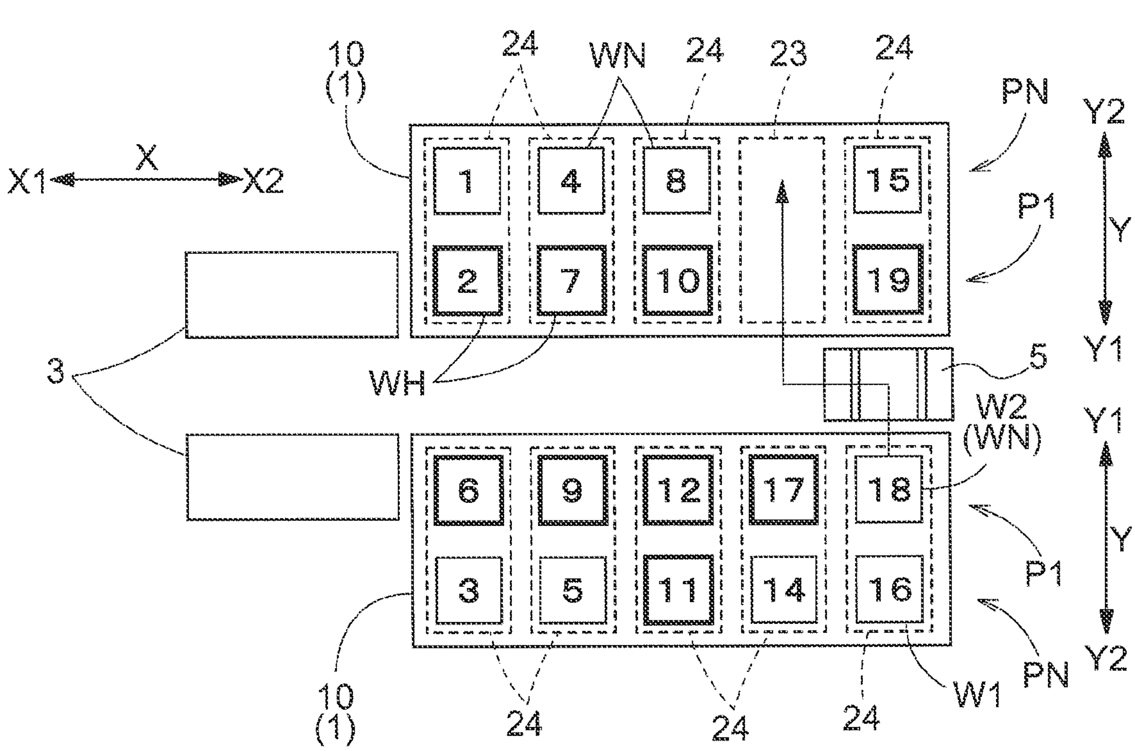
FIG. 9 is a diagram showing an example of rearrangement processing.

FIG. 9 envisions a scene in which, after articles W up to the nineteenth article have been stored in the storage racks 1 as shown in FIG. 8, the high frequency article WH stored thirteenth is retrieved from the corresponding storage rack 1, and then the normal article WN stored sixteenth is retrieved from the corresponding storage rack 1. Also, FIG. 10 envisions a scene in which, after articles W up to the nineteenth article have been stored in the storage racks 1 as shown in FIG. 8, the high frequency article WH stored thirteenth is retrieved from the corresponding storage rack 1, and then the normal article WN stored eighth is retrieved from the corresponding storage rack 1. Also, FIG. 11 envisions a scene in which, after articles W up to the nineteenth article have been stored in the storage racks 1 as shown in FIG. 8, the normal article WN stored fourth is retrieved from the corresponding storage rack 1.

In the present embodiment, when performing rearrangement processing to move the movement target article W2 to another storage section 20, if the movement target article W2 is a high frequency article WH, the control system 30 controls the transport device 5 so as to preferentially store the movement target article W2 at a first storage position P1, whereas if the movement target article W2 is a normal article WN, the control system 30 controls the transport device 5 so as to preferentially store the movement target article W2 at a normal storage position PN.

Figure 10:
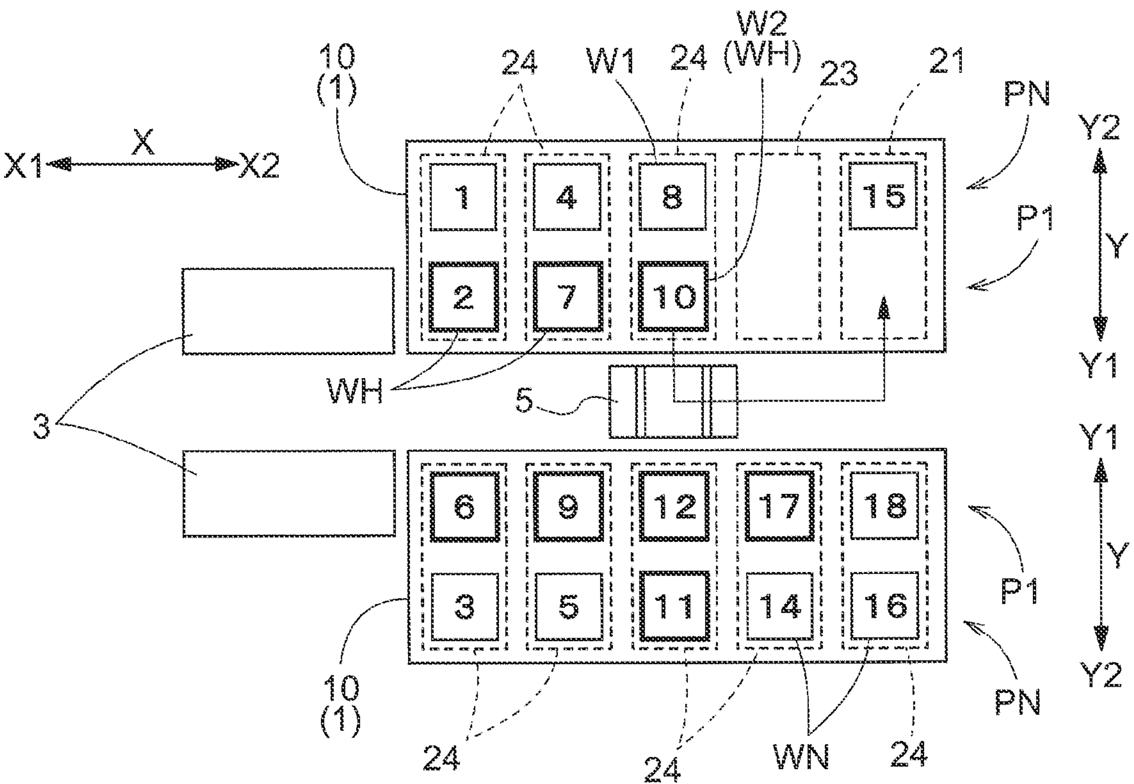
FIG. 10 is a diagram showing another example of rearrangement processing.
Figure 11:
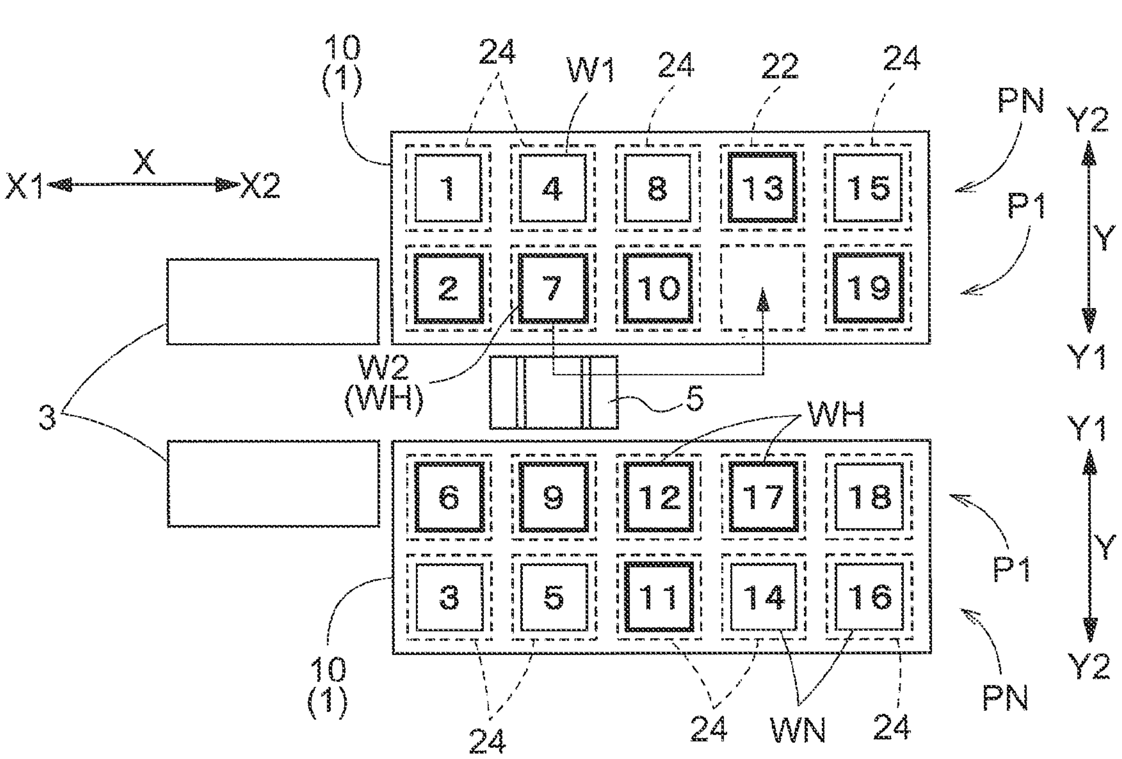
FIG. 11 is a diagram showing yet another example of rearrangement processing.

Specifically, in the case where the movement target article W2 is a high frequency article WH, if a first-state storage section 21 exists, the control system 30 controls the transport device 5 so as to store the movement target article W2 at the first storage position P1 in the first-state storage section 21 (see FIG. 10). Also, in the case where the movement target article W2 is a high frequency article WH, if a first-state storage section 21 does not exist and a second-state storage section 22 exists, the control system 30 controls the transport device 5 so as to store the movement target article W2 at the first storage position P1 in the second-state storage section 22 (see FIG. 11), whereas if both a first-state storage section 21 and a second-state storage section 22 do not exist, the control system 30 controls the transport device 5 so as to store the movement target article W2 at the normal storage position PN in a third-state storage section 23.

In the case where the movement target article W2 is a normal article WN, if a third-state storage section 23 exists, the control system 30 controls the transport device 5 so as to store the normal article WN at the normal storage position PN in the third-state storage section 23 (see FIG. 9). Furthermore, in the case where the movement target article W2 is a normal article WN, if a third-state storage section 23 does not exist and a first-state storage section 21 exists, the control system 30 controls the transport device 5 so as to store the normal article WN at the first storage position P1 in the first-state storage section 21, whereas if both a third-state storage section 23 and a first-state storage section 21 do not exist, the control system 30 controls the transport device 5 so as to store the normal article WN at the first storage position P1 in a second-state storage section 22.

Note that in the case of performing rearrangement processing, there are cases where there are a plurality of storage sections 20 that can store the movement target article W2. In the present embodiment, in the case where the movement target article W2 is a high frequency article WH, the storage sections 20 that can store the movement target article W2 include the following: if a first-state storage section 21 exists, then that first-state storage section 21; if a first-state storage section 21 does not exist and a second-state storage section 22 exists, then that second-state storage section 22; and if both a first-state storage section 21 and second-state storage section 22 do not exist, then a third-state storage section 23. Furthermore, in the case where the movement target article W2 is a normal article WN, the storage sections 20 that can store the movement target article W2 include the following: if a third-state storage section 23 exists, then that third-state storage section 23; if a third-state storage section 23 does not exist and a first-state storage section 21 exists, then that first-state storage section 21; and if both a third-state storage section 23 and a first-state storage section 21 do not exist, then a second-state storage section 22.

For example, in the case of performing rearrangement processing, if there are a plurality of storage sections 20 that can store the movement target article W2, the control system 30 may control the transport device 5 so as to preferentially store the movement target article W2 in the storage section 20 that is closest, in terms of distance of transport by the transport device 5, to the storage section 20 in which the movement target article W2 had been stored. In the present embodiment, the transport device 5 transports articles W in the rack width direction X, and therefore the above-mentioned distance of transport is the distance of transport in the rack width direction X.

Other Embodiments

Next, other embodiments of the article storage facility will be described.

Figure 14:
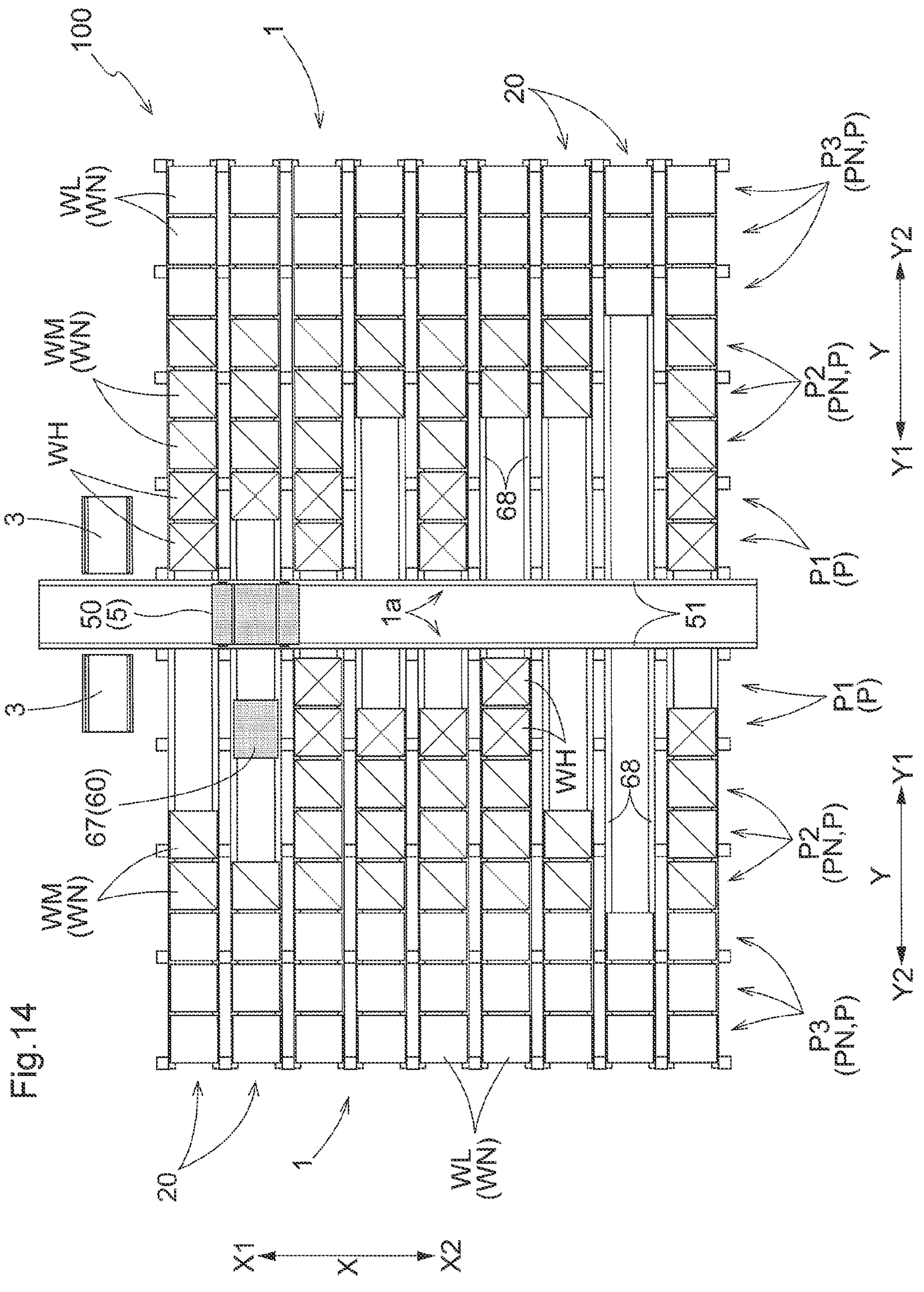
FIG. 14 is a plan view of an article storage facility according to another embodiment.

(1) In the above embodiment, an example is described in which the articles W are classified into two types, namely high frequency articles WH and normal articles WN, according to the retrieval frequency. However, the present disclosure is not limited to such a configuration, and the normal articles WN can also be further classified into a plurality of types according to the retrieval frequency. For example, the normal articles WN may include a medium frequency article WM whose retrieval frequency is less than the high frequency threshold value and greater than or equal to a predetermined low frequency threshold value, and a low frequency article WL whose retrieval frequency is less than the low frequency threshold value, and the articles W can be classified into high frequency articles WH, medium frequency articles WM, and low frequency articles WL according to the retrieval frequency. In the example shown in FIG. 14, which will be referred to later, the articles W are classified into high frequency articles WH, medium frequency articles WM, and low frequency articles WL in this manner. In FIG. 14, in order to easily distinguish between high frequency articles WH, medium frequency articles WM, and low frequency articles WL, these three types of articles are represented by different shapes. Specifically, a low frequency article WL is represented by a rectangle with no pattern inside, and a high frequency article WH and a medium frequency article WM are represented by rectangles that have different inner patterns.

In the configuration in which one first storage position Pl and one normal storage position PN are set in each storage section 20 as in the above embodiment, if the articles W are classified into high frequency articles WH, medium frequency articles WM, and low frequency articles WL, by storing the articles in the storage racks 1 as described below, it is possible for high frequency articles WH to be preferentially stored at the first storage positions P1, and for normal articles WN to be preferentially stored at the normal storage positions PN. In the following, a first-state storage section 21 in which a low frequency article WL is stored at the normal storage position PN is referred to as a "first-type first-state storage section", and a first-state storage section 21 in which a medium frequency article WM is stored at the normal storage position PN is referred to as a "second-type first-state storage section".

Specifically, in the case where the target article is a high frequency article WH, if a first-type first-state storage section exists, the control system 30 controls the transport device 5 so as to store the target article at the first storage position P1 in the first-type first-state storage section. Also, in the case where the target article is a high frequency article WH, if a first-type first-state storage section does not exist and a second-type first-state storage section exists, the control system 30 controls the transport device 5 so as to store the target article at the first storage position P1 in the second-type first-state storage section. Also, in the case where the target article is a high frequency article WH, if a first-state storage section 21 does not exist and a second-state storage section 22 exists, the control system 30 controls the transport device 5 so as to store the target article at the first storage position P1 in the second-state storage section 22, whereas if both a first-state storage section 21 and a second-state storage section 22 do not exist, the control system 30 controls the transport device 5 so as to store the target article at the normal storage position PN in a third-state storage section 23.

Also, in the case where the target article is a medium frequency article WM, if a first-type first-state storage section exists, the control system 30 controls the transport device 5 so as to store the target article at the first storage position P1 in the first-type first-state storage section. Also, in the case where the target article is a medium frequency article WM, if a first-type first-state storage section does not exist and a second-type first-state storage section exists, the control system 30 controls the transport device 5 so as to store the target article at the first storage position P1 in the second-type first-state storage section. In the case where the target article is a medium frequency article WM, if a first-state storage section 21 does not exist and a third-state storage section 23 exists, the control system 30 controls the transport device 5 so as to store the target article at the normal storage position PN in the third-state storage section 23, whereas if both a first-state storage section 21 and a third-state storage section 23 do not exist, the control system 30 controls the transport device 5 so as to store the target article at the first storage position P1 in a second-state storage section 22. Note that in the case where the target article is a medium frequency article WM, if a first-state storage section 21 does not exist and a second-state storage section 22 exists, the control system 30 may be configured to control the transport device 5 so as to store the target article at the first storage position P1 in the second-state storage section 22, whereas if both a first-state storage section 21 and a second-state storage section 22 do not exist, the control system 30 may be configured to control the transport device 5 so as to store the target article at the normal storage position PN in a third-state storage section 23.

Also, in the case where the target article is a low frequency article WL, if a third-state storage section 23 exists, the control system 30 controls the transport device 5 so as to store the target article at the normal storage position PN in the third-state storage section 23. In the case where the target article is a normal article WN, if a third-state storage section 23 does not exist and a first-type first-state storage section exists, the control system 30 controls the transport device 5 so as to store the target article at the first storage position P1 in the first-type first-state storage section, whereas if both a third-state storage section 23 and a first-type first-state storage section do not exist and a second-type first-state storage section exists, the control system 30 controls the transport device 5 so as to store the target article at the first storage position P1 in the second-type first-state storage section. In the case where the target article is a normal article WN, if both a third-state storage section 23 and a first-state storage section 21 do not exist, the control system 30 controls the transport device 5 so as to store the target article at the first storage position P1 in a second-state storage section 22.

(2) In the above embodiment, an example is described in which the storage sections 20 are each capable of storing two articles W next to each other in the rack depth direction Y, and two storage positions P are set in each storage section 20. However, the present disclosure is not limited to such a configuration, and as shown in the example shown in FIG. 14, a configuration is also possible in which a storage section 20 can store three or more articles W next to each other in the rack depth direction Y, and three or more storage positions P are set in the storage section 20.

In the example shown in FIG. 14, the transfer device 60 includes a cart 67 that travels in the rack depth direction Y. The travel path of the cart 67 is formed by a pair of transfer rails 68 that are arranged at the same position in the up-down direction Z and spaced apart in the rack width direction X. The cart 67 can move in the rack width direction X while located on the travel section 50, and can also move in the rack depth direction Y while separated from the travel section 50. By moving in the rack depth direction Y while supporting an article W, the cart 67 can retrieve articles W from the storage sections 20 and store articles W in the storage sections 20. Specifically, the cart 67 retrieves an article W from a storage section 20 by moving from the storage section 20 toward the rack front surface side Y1 while supporting the article W. Also, the cart 67 stores an article W in a storage section 20 by moving from the travel section 50 toward the rack back surface side Y2 while supporting the article W. Note that the cart 67 is able to raise and lower a support surface that supports an article W from the lower side Z2, and by lowering the support surface, the cart 67 can move in the rack depth direction Y without interfering with an article W stored in the storage section 20.

In the example shown in FIG. 14, two first storage positions P1 and six normal storage positions PN are set in one storage section 20. Here, the storage positions in the storage section 20 include at least one second storage position P2, which is a normal storage position PN adjacent to the first storage position P1 on the rack back surface side Y2 thereof, and at least one third storage position P3, which is a normal storage position PN adjacent to the second storage position P2 on the rack back surface side Y2 thereof. In the example shown in FIG. 14, in the storage section 20, three normal storage positions PN adjacent to the two first storage positions P1 on the rack back surface side Y2 thereof are second storage positions P2, and three normal storage positions PN adjacent to the second storage positions P2 on the rack back surface side Y2 thereof are third storage positions P3.

In the example shown in FIG. 14, the articles W are classified into high frequency articles WH, medium frequency articles WM, and low frequency articles WL according to the retrieval frequency. In other words, the normal articles WN include a medium frequency article WM whose retrieval frequency is less than the high frequency threshold value and greater than or equal to a predetermined low frequency threshold value, and a low frequency article WL whose retrieval frequency is less than the low frequency threshold value. In this case, it is preferable that the control system 30 controls the transport device 5 so as to preferentially store a high frequency article WH at a first storage position P1, preferentially store a medium frequency article WM at a second storage position P2, and preferentially store a low frequency article WL at a third storage position P3.

(3) In the above embodiment, an example is described in which the storage sections 20 included in each of the storage racks 1 are arranged in a plurality of rows in the horizontal direction (specifically, in the rack width direction X) and in a plurality of levels in the up-down direction Z. However, the present disclosure is not limited to such a configuration, and a plurality of storage sections 20 may be arranged next to each other in only the horizontal direction, or a plurality of storage sections 20 may be arranged next to each other in only the up-down direction Z.

(4) In the above-described embodiment, an example is described in which the transport device 5 includes the travel section 50 that travels in the horizontal direction (specifically, the rack width direction X). However, the present disclosure is not limited to such a configuration, and for example, the transport device 5 may include a conveyor that transports the article W in the horizontal direction.

(5) In the above embodiment, an example is described in which the transport device 5 transports the article W in the rack width direction X along the rack front surface 1*a*. However, the present disclosure is not limited to such a configuration, and for example, the transport device 5 may transport the article W in the up-down direction Z along the rack front surface 1*a*. In this case, the transport device 5 includes a lift device that raises and lowers the article W in the up-down direction Z, for example. Also, the transport device 5 may be configured to transport the article W in the rack width direction X and the up-down direction Z along the rack front surface 1*a*. As a specific example, the transport device 5 may be a stacker crane. In this case, in addition to the travel section 50 that travels in the rack width direction X, the transport device 5 also includes an elevation body that is raised and lowered while being guided by a mast provided upright on the travel section 50, and the transfer device 60 is supported by the elevation body. The transport device 5 transports the article W in the rack width direction X and the up-down direction Z along the rack front surface 1*a* by the traveling of the travel section 50 and the raising and lowering of the elevation body.

(6) In the above embodiment, an example is described in which the rack front surface 1*a* is a vertical plane (in other words, the rack depth direction Y is the horizontal direction). However, the present disclosure is not limited to such a configuration, and for example, the rack front surface 1*a* may be a horizontal plane (in other words, the rack depth direction Y is the up-down direction Z). In this case, the storage sections 20 can store a plurality of articles W next to each other in the up-down direction Z, which is the rack depth direction Y. Also, in this case, for example, the storage sections 20 included in the storage rack 1 are arranged next to each other in two directions orthogonal to each other on the horizontal plane, and the travel section 50 of the transport device 5 can travel in these two directions.

(7) It should be noted that the configurations disclosed in each of the above-described embodiments can also be applied in combination with configurations disclosed in other embodiments (including combinations between embodiments described as other embodiments) as long as no contradiction arises. Regarding such other configurations as well, the embodiments disclosed in this specification are merely examples in all respects. Therefore, various modifications can be made as appropriate without departing from the spirit of the present disclosure.

Overview of Embodiments

The following is a description of aspects of the article storage facility described above.

An article storage facility includes: a storage rack including a plurality of storage sections; a transport device configured to transport an article along a rack front surface, which is a front surface of the storage rack; and a control system configured to control the transport device, wherein with a rack depth direction being a direction orthogonal to the rack front surface, a rack front surface side being a side corresponding to the rack front surface in the rack depth direction, and a rack back surface side being a side opposite to the rack front surface side in the rack depth direction, the storage sections are each configured to store a plurality of the articles next to each other in the rack depth direction, the transport device includes a transfer device configured to retrieve the articles from the storage sections and store the articles in the storage sections by moving the articles in the rack depth direction, from a position on the rack front surface side of the storage rack, the control system includes a storage unit configured to store article type information and retrieval frequency information in association with each other, the article type information indicating an article type for each of the articles, and the retrieval frequency information indicating a retrieval frequency for each of the article types, the plurality of articles include a high frequency article which is an article of an article type for which the retrieval frequency is a predetermined high frequency threshold value or more, and a normal article which is an article of an article type for which the retrieval frequency is less than the high frequency threshold value, each of the storage sections has a plurality of storage positions at which the articles are stored, the plurality of storage positions including at least one first storage position, which is a storage position closest to the rack front surface side, and at least one normal storage position, which is a storage position on the rack back surface side of the first storage position, and the control system controls the transport device so as to preferentially store the high frequency article at the first storage position and preferentially store the normal article at the normal storage position.

According to this configuration, each storage section of the storage rack is capable of storing a plurality of articles next to each other in the rack depth direction, and therefore compared with the case where only one article is stored in a storage section, it is possible to increase the article storage rate per unit of volume, and it is also possible to keep the cost of the transport device low relative to the number of articles that can be stored. Also, according to the above configuration, taking into account the retrieval frequency of each type of article, it is possible to preferentially store the high frequency article at the first storage position and preferentially store the normal article at the normal storage position. In other words, a high frequency article having a relatively high retrieval frequency can be preferentially stored at a position where rearrangement processing is not required for retrieval from the storage section, or in the case where rearrangement processing is required, a position where fewer articles are subjected to rearrangement processing (i.e., a position where rearrangement processing needs to be performed fewer times). This makes it possible to keep the frequency of execution of the rearrangement processing low for the storage rack overall.

Note that a high frequency article having a relatively high retrieval frequency is likely to be stored in and retrieved from a storage section more often than a normal article having a relatively low retrieval frequency. According to this configuration, a high frequency article that is likely to be stored in and retrieved from a storage section frequently is preferentially stored at the first storage position where the transfer time is likely to be shorter due to a shorter distance of transfer by the transfer device. Therefore, there is also an advantage that the time required for the storage and retrieval of articles can be easily shortened for the storage rack overall.

Here, it is preferable that the plurality of storage sections include a first-state storage section in which the normal article is stored at the normal storage position and no article is stored at the first storage position, and in a case where a target article, which is the article to be stored in the storage rack, is the high frequency article, in response to the first-state storage section existing, the control system controls the transport device so as to store the target article at the first storage position in the first-state storage section.

According to this configuration, a high frequency article can be preferentially stored at the first storage position. Note that while a high frequency article is stored at the first storage position in the first-state storage section, if a normal article stored at the normal storage position in the first-state storage section is to be retrieved, rearrangement processing needs to be performed on the high frequency article, but since the retrieval frequency of the normal article is relatively low, the frequency of execution of rearrangement processing on the high frequency article stored at the first storage position in the first-state storage section is likely to be kept low. Therefore, if a first-state storage section exists, by storing a high frequency article at the first storage position in the first-state storage section, it is possible to reduce the frequency of execution of the rearrangement processing for the storage rack overall.

In the above configuration, it is preferable that the plurality of storage sections include a second-state storage section in which the high frequency article is stored at the normal storage position and no article is stored at the first storage position, and a third-state storage section in which no articles are stored at the first storage position and the normal storage position, and in a case where the target article is the high frequency article, in response to the first-state storage section not existing and the second-state storage section existing, the control system controls the transport device so as to store the target article at the first storage position in the second-state storage section, and in response to the first-state storage section and the second-state storage section not existing, the control system controls the transport device so as to store the target article at the normal storage position in the third-state storage section.

According to this configuration, even if a first-state storage section does not exist, if a second-state storage section exists, the high frequency article is stored at the first storage position in the second-state storage section, thus making it possible to reduce the frequency of execution of the rearrangement processing for the storage rack overall. More specifically, if a high frequency article is stored at the normal storage position in the third-state storage section, and then a normal article is stored at the first storage position in the third-state storage section, the normal article having a relatively low retrieval frequency is located on the rack front surface side of the high frequency article having a relatively high retrieval frequency, and rearrangement processing is likely to become necessary. On the other hand, according to this configuration, in the case where a first-state storage section does not exist and a second-state storage section exists, the high frequency article is stored at the first storage position in the second-state storage section instead of at the normal storage position in a third-state storage section, and therefore it is possible to avoid, whenever possible, the case where a normal article having a relatively low retrieval frequency is located on the rack front surface side of a high frequency article having a relatively high retrieval frequency, and it is possible to reduce the frequency of execution of the rearrangement processing for the storage rack overall.

Also, it is preferable that the plurality of storage sections include a third-state storage section in which no articles are stored at the first storage position and the normal storage position, and in a case where a target article, which is the article to be stored in the storage rack, is the normal article, in response to the third-state storage section existing, the control system controls the transport device so as to store the target article at the normal storage position in the third-state storage section.

According to this configuration, a normal article can be preferentially stored at the normal storage position. Therefore, it is more likely for there to be a storage section in which an article is not stored at the first storage position, and it is easier to preferentially store a high frequency article at the first storage position.

In the above configuration, it is preferable that the plurality of storage sections further include a first-state storage section in which the normal article is stored at the normal storage position and no article is stored at the first storage position, and a second-state storage section in which the high frequency article is stored at the normal storage position and no article is stored at the first storage position, and in a case where the target article is the normal article, in response to the third-state storage section not existing and the first-state storage section existing, the control system controls the transport device so as to store the target article at the first storage position in the first-state storage section, and in response to the third-state storage section and the first-state storage section not existing, the control system controls the transport device so as to store the target article at the first storage position in the second-state storage section.

According to this configuration, even in the case where a third-state storage section does not exist, if a first-state storage section exists, the normal article can be stored at the first storage position in the first-state storage section, thus making it possible to reduce the frequency of execution of the rearrangement processing for the storage rack overall. More specifically, if the normal article is stored at the first storage position in the second-state storage section, the normal article having a relatively low retrieval frequency is located on the rack front surface side of the high frequency article having a relatively high retrieval frequency, and rearrangement processing is likely to become necessary. In contrast to this, according to the above configuration, in the case where a third-state storage section does not exist and a first-state storage section exists, the normal article is stored at the first storage position in the first-state storage section instead of at the first storage position in a second-state storage section, and therefore it is possible to avoid, whenever possible, the case where a normal article having a relatively low retrieval frequency is located on the rack front surface side of a high frequency article having a relatively high retrieval frequency, and it is possible to reduce the frequency of execution of the rearrangement processing for the storage rack overall.

Also, it is preferable that the article storage facility further includes: a storage and retrieval section to which a storage article to be stored in the storage rack can be carried in, and from which a retrieved article retrieved from the storage rack can be carried out, wherein in a case where the high frequency article is to be stored in the storage rack, in response to a plurality of storage sections capable of storing the high frequency article existing, the control system controls the transport device so as to preferentially store the high frequency article in a storage section closest to the storage and retrieval section among the storage sections capable of storing the high frequency article, and in a case where the normal article is to be stored in the storage rack, in response to a plurality of storage sections capable of storing the normal article existing, the control system controls the transport device so as to preferentially store the normal article in a storage section farthest from the storage and retrieval section among the storage sections capable of storing the normal article.

According to this configuration, a high frequency article having a relatively high retrieval frequency is preferentially stored in a storage section close to the storage and retrieval section, and therefore the distance of transport of a high frequency article by the transport device during retrieval can be kept short. Also, a high frequency article having a relatively high retrieval frequency also has a relatively high storage frequency, and in the case where a retrieved article is to be re-stored in the storage rack, according to the above configuration, a high frequency article having a relatively high storage frequency is preferentially stored in a storage section close to the storage and retrieval section, and therefore the distance of transport of a high frequency article by the transport device during storage can be kept short. Therefore, the efficiency of article storage and retrieval can be improved. Furthermore, according to the above configuration, a normal article having a relatively low retrieval frequency is preferentially stored in a storage section farther from the storage and retrieval section, thus making it easier to store a high frequency article closer to the storage and retrieval section.

Also, it is preferable that the plurality of articles include a retrieval target article, which is to be retrieved from the storage rack, and a movement target article, which is stored on the rack front surface side of the retrieval target article in the storage section storing the retrieval target article, and in a case where the control system performs rearrangement processing to move the movement target article to another storage section, in response to the movement target article being the high frequency article, the control system controls the transport device so as to preferentially store the movement target article at the first storage position, and in response to the movement target article being the normal article, the control system controls the transport device so as to preferentially store the movement target article at the normal storage position.

According to this configuration, even when rearrangement processing is performed, the high frequency article can be preferentially stored at the first storage position, and the normal article can be preferentially stored at the normal storage position.

In the above configuration, it is preferable that in a case of performing the rearrangement processing, in response to a plurality of storage sections capable of storing the movement target article existing, the control system controls the transport device so as to preferentially store the movement target article in a storage section closest, in terms of distance of transport by the transport device, to the storage section in which the movement target article was stored.

According to this configuration, it is possible to shorten the distance of transport of a movement target article by the transport device in the rearrangement processing, and therefore even when rearrangement processing is required, the time required for retrieval of a retrieval target article can be kept short, and article retrieval efficiency can be increased.

Also, it is preferable that there are a plurality of the normal articles, including a medium frequency article for which the retrieval frequency is less than the high frequency threshold value and greater than or equal to a predetermined low frequency threshold value, and a low frequency article for which the retrieval frequency is less than the low frequency threshold value, the storage sections are each configured to store three or more articles next to each other in the rack depth direction, each of the storage sections has at least one second storage position, which is a normal storage position adjacent to the first storage position on the rack back surface side thereof, and at least one third storage position, which is a normal storage position adjacent to the second storage position on the rack back surface side thereof, and the control system controls the transport device so as to preferentially store the medium frequency article at the second storage position and preferentially store the low frequency article at the third storage position.

According to this configuration, each storage section of the storage rack is capable of storing three or more articles next to each other in the rack depth direction, and therefore compared with the case where only one or two articles are stored in a storage section, it is possible to increase the article storage rate per unit of volume, and it is also possible to keep the cost of the transport device low relative to the number of articles that can be stored. Also, according to this configuration, there are at least three retrieval frequencies for corresponding types of articles, and preferential storage positions are set for articles such that the higher the retrieval frequency is, the lower the number of times rearrangement processing needs to be performed is. Therefore, it is possible to reduce the frequency of execution of the rearrangement processing for the storage rack overall.

The article storage facility according to the present disclosure need only be capable of achieving at least one of the effects described above.

DESCRIPTION OF REFERENCE SIGNS

1 Storage rack
**1*a*** Rack front surface
3 Storage and retrieval section
5 Transport device
20 Storage section
21 First-state storage section
22 Second-state storage section
23 Third-state storage section
30 Control system
32 Storage unit
60 Transfer device
70 Article type information
71 Retrieval frequency information
100 Article storage facility
P Storage position
P1 First storage position
P2 Second storage position
P3 Third storage position
PN Normal storage position
W Article
W1 Retrieval target article
W2 Movement target article
WH High frequency article
WL Low frequency article
WM Medium frequency article
WN Normal article
Rack depth direction
Y1 Rack front surface side
Y2 Rack back surface side

The invention claimed is:

1. An article storage facility comprising:

a storage rack comprising a plurality of storage sections;

a transport device configured to transport an article along a rack front surface, which is a front surface of the storage rack; and a control system configured to control the transport device, and wherein:

a rack depth direction is a direction orthogonal to the rack front surface, a rack front surface side is a side corresponding to the rack front surface in the rack depth direction, and a rack back surface side is a side opposite to the rack front surface side in the rack depth direction, the storage sections are each configured to store a plurality of the articles next to each other in the rack depth direction, the transport device comprises a transfer device configured to retrieve the articles from the storage sections and store the articles in the storage sections by moving the articles in the rack depth direction, from a position on the rack front surface side of the storage rack, the control system comprises a storage unit configured to store article type information and retrieval frequency information in association with each other, the article type information indicating an article type for each of the articles, and the retrieval frequency information indicating a retrieval frequency for each of the article types, the plurality of articles comprise a high frequency article which is an article of an article type for which the retrieval frequency is a predetermined high frequency threshold value or more, and a normal article which is an article of an article type for which the retrieval frequency is less than the high frequency threshold value, each of the storage sections has a plurality of storage positions at which the articles are stored, the plurality of storage positions comprising at least one first storage position, which is a storage position closest to the rack front surface side, and at least one normal storage position, which is a storage position on the rack back surface side of the first storage position, and the control system controls the transport device so as to preferentially store the high frequency article at the first storage position and preferentially store the normal article at the normal storage position.

2. The article storage facility according to claim 1, further comprising:

a storage and retrieval section to which a storage article to be stored in the storage rack can be carried in, and from which a retrieved article retrieved from the storage rack can be carried out, and wherein in a case where the high frequency article is to be stored in the storage rack, in response to a plurality of storage sections capable of storing the high frequency article existing, the control system controls the transport device so as to preferentially store the high frequency article in a storage section closest to the storage and retrieval section among the storage sections capable of storing the high frequency article, and in a case where the normal article is to be stored in the storage rack, in response to a plurality of storage sections capable of storing the normal article existing, the control system controls the transport device so as to preferentially store the normal article in a storage section farthest from the storage and retrieval section among the storage sections capable of storing the normal article.

3. The article storage facility according to claim 1, wherein:

there are a plurality of the normal articles, comprising a medium frequency article for which the retrieval frequency is less than the high frequency threshold value and greater than or equal to a predetermined low frequency threshold value, and a low frequency article for which the retrieval frequency is less than the low frequency threshold value, the storage sections are each configured to store three or more articles next to each other in the rack depth direction, each of the storage sections has at least one second storage position, which is a normal storage position adjacent to the first storage position on the rack back surface side thereof, and at least one third storage position, which is a normal storage position adjacent to the second storage position on the rack back surface side thereof, and the control system controls the transport device so as to preferentially store the medium frequency article at the second storage position and preferentially store the low frequency article at the third storage position.

4. The article storage facility according to claim 1, wherein the plurality of storage sections comprise a first-state storage section in which the normal article is stored at the normal storage position and no article is stored at the first storage position, and wherein in a case where a target article, which is the article to be stored in the storage rack, is the high frequency article, in response to the first-state storage section existing, the control system controls the transport device so as to store the target article at the first storage position in the first-state storage section.

5. The article storage facility according to claim 4, wherein the plurality of storage sections comprise a second-state storage section in which the high frequency article is stored at the normal storage position and no article is stored at the first storage position, and a third-state storage section in which no articles are stored at the first storage position and the normal storage position, and in a case where the target article is the high frequency article, in response to the first-state storage section not existing and the second-state storage section existing, the control system controls the transport device so as to store the target article at the first storage position in the second-state storage section, and in response to the first-state storage section and the second-state storage section not existing, the control system controls the transport device so as to store the target article at the normal storage position in the third-state storage section.

6. The article storage facility according to claim 1, wherein the plurality of storage sections comprise a third-state storage section in which no articles are stored at the first storage position and the normal storage position, and wherein in a case where a target article, which is the article to be stored in the storage rack, is the normal article, in response to the third-state storage section existing, the control system controls the transport device so as to store the target article at the normal storage position in the third-state storage section.

7. The article storage facility according to claim 6, wherein the plurality of storage sections further comprise a first-state storage section in which the normal article is stored at the normal storage position and no article is stored at the first storage position, and a second-state storage section in which the high frequency article is stored at the normal storage position and no article is stored at the first storage position, and wherein in a case where the target article is the normal article, in response to the third-state storage section not existing and the first-state storage section existing, the control system controls the transport device so as to store the target article at the first storage position in the first-state storage section, and in response to the third-state storage section and the first-state storage section not existing, the control system controls the transport device so as to store the target article at the first storage position in the second-state storage section.

8. The article storage facility according to claim 1, wherein the plurality of articles comprise a retrieval target article, which is to be retrieved from the storage rack, and a movement target article, which is stored on the rack front surface side of the retrieval target article in the storage section storing the retrieval target article, and wherein in a case where the control system performs rearrangement processing to move the movement target article to another storage section, in response to the movement target article being the high frequency article, the control system controls the transport device so as to preferentially store the movement target article at the first storage position, and in response to the movement target article being the normal article, the control system controls the transport device so as to preferentially store the movement target article at the normal storage position.

9. The article storage facility according to claim 8, wherein in a case of performing the rearrangement processing, in response to a plurality of storage sections capable of storing the movement target article existing, the control system controls the transport device so as to preferentially store the movement target article in a storage section closest, in terms of distance of transport by the transport device, to the storage section in which the movement target article was stored.

10. An article storage method to be executed by a control system in an article storage facility, the article storage facility comprising:

a storage rack comprising a plurality of storage sections;

a transport device configured to transport an article along a rack front surface, which is a front surface of the storage rack; and the control system configured to control the transport device, and the article storage method comprising a step of controlling the transport device so as to preferentially store a high frequency article at a first storage position and preferentially store a normal article at a normal storage position, and wherein:

a rack depth direction is a direction orthogonal to the rack front surface, a rack front surface side is a side corresponding to the rack front surface in the rack depth direction, and a rack back surface side being-is a side opposite to the rack front surface side in the rack depth direction, the storage sections are each configured to store a plurality of the articles next to each other in the rack depth direction, the transport device comprises a transfer device configured to retrieve the articles from the storage sections and store the articles in the storage sections by moving the articles in the rack depth direction, from a position on the rack front surface side of the storage rack, the plurality of articles includes the high frequency article which is an article of an article type for which the retrieval frequency is a predetermined high frequency threshold value or more, and the normal article which is an article of an article type for which the retrieval frequency is less than the high frequency threshold value, based on information in which article type information and retrieval frequency information are associated with each other, the article type information indicating an article type for each of the articles, and the retrieval frequency information indicating a retrieval frequency for each of the article types, and each of the storage sections has a plurality of storage positions at which the articles are stored, the plurality of storage positions comprising at least one first storage position, which is a storage position closest to the rack front surface side, and at least one normal storage position, which is a storage position on the rack back surface side of the first storage position.

11. An article storage program for controlling an article storage facility, the article storage facility comprising:

a storage rack comprising a plurality of storage sections;

a transport device configured to transport an article along a rack front surface, which is a front surface of the storage rack; and a control system configured to control the transport device, and wherein:

the article storage program causes a computer in the control system to realize a function of controlling the transport device so as to preferentially store a high frequency article at a first storage position and preferentially store a normal article at a normal storage position, a rack depth direction is a direction orthogonal to the rack front surface, a rack front surface side is a side corresponding to the rack front surface in the rack depth direction, and a rack back surface side is a side opposite to the rack front surface side in the rack depth direction, the storage sections are each configured to store a plurality of the articles next to each other in the rack depth direction, the transport device comprises a transfer device configured to retrieve the articles from the storage sections and store the articles in the storage sections by moving the articles in the rack depth direction, from a position on the rack front surface side of the storage rack, the plurality of articles includes the high frequency article which is an article of an article type for which the retrieval frequency is a predetermined high frequency threshold value or more, and the normal article which is an article of an article type for which the retrieval frequency is less than the high frequency threshold value, based on information in which article type information and retrieval frequency information are associated with each other, the article type information indicating an article type for each of the articles, and the retrieval frequency information indicating a retrieval frequency for each of the article types, and each of the storage sections has a plurality of storage positions at which the articles are stored, the plurality of storage positions including at least one first storage position, which is a storage position closest to the rack front surface side, and at least one normal storage position, which is a storage position on the rack back surface side of the first storage position.

* * * * *